United States Patent [19]
Tatsumi et al.

[11] Patent Number: 5,594,736
[45] Date of Patent: Jan. 14, 1997

[54] IMAGE-INFORMATION STORAGE REGENERATING DEVICE

[75] Inventors: Masahiro Tatsumi; Noritaka Koizumi, both of Chiba; Keiichi Hibi, Matsudo; Tsuneaki Iwano, Tokyo; Hiroyuki Ito, Chiba; Osamu Nakamura, Hanno; Hirotaka Nakano, Musashino, all of Japan

[73] Assignee: Sharp Kabushiki Kaisha, Osaka, Japan

[21] Appl. No.: 364,891

[22] Filed: Dec. 23, 1994

[30] Foreign Application Priority Data

Dec. 24, 1993 [JP] Japan .................................. 5-328365
Dec. 24, 1993 [JP] Japan .................................. 5-328555
Dec. 24, 1993 [JP] Japan .................................. 5-328717
Dec. 24, 1993 [JP] Japan .................................. 5-328822

[51] Int. Cl.⁶ ........................................................ H04J 3/24
[52] U.S. Cl. .......................... 370/474; 370/535; 348/466; 348/232
[58] Field of Search ........................ 348/466, 467, 348/423, 17, 670, 393, 394, 395, 419; 370/94.1, 97, 60, 60.1, 94.2, 112, 84, 85.6, 118, 109, 108, 110.1; 371/37.1, 38.1, 39.1, 30, 37.2, 37.7, 37.8, 40.2, 69.1; 375/206, 371, 363, 214; 455/18; 379/53, 96

[56] References Cited

U.S. PATENT DOCUMENTS

| | | | |
|---|---|---|---|
| 5,012,338 | 4/1991 | Davies | 348/467 |
| 5,159,452 | 10/1992 | Kinoshita et al. | 348/466 |
| 5,347,305 | 9/1994 | Bush et al. | 348/17 |
| 5,392,284 | 2/1995 | Sugiyama | 348/17 |
| 5,481,543 | 1/1996 | Veltman | 370/112 |

FOREIGN PATENT DOCUMENTS

| | | |
|---|---|---|
| 62-188579 | 8/1987 | Japan . |
| 3-132128 | 6/1991 | Japan . |
| 4-079655 | 3/1992 | Japan . |

OTHER PUBLICATIONS

Ichizo Kimura et al., Prototyping of PC–Videophone with Built–In Codec based on Open Architecture, 1993, The Journal of the Institute of Image Electronics Engineers of Japan, vol. 22, No. 4, pp. 355–367.

*Primary Examiner*—Douglas W. Olms
*Assistant Examiner*—Dang Ton

[57] ABSTRACT

The present invention provides such a data storing format that is effective for solving problems which may arise when regenerating video data in a video data storage and communication system. A channel data demultiplexing portion splits a multiplexed input into audio/video and other components. An error correction portion corrects an error of the video data output from the channel data demultiplexing portion. A video frame extracting portion extracts a video frame output from the error correction portion. A packet assembling portion assembles a packet from the video data output from the video frame extracting portion and the audio data output from the data demultiplexing portion. A storage portion stores therein the packet output from the packet assembling portion. Consequently, video data can be stored by video frames.

11 Claims, 33 Drawing Sheets

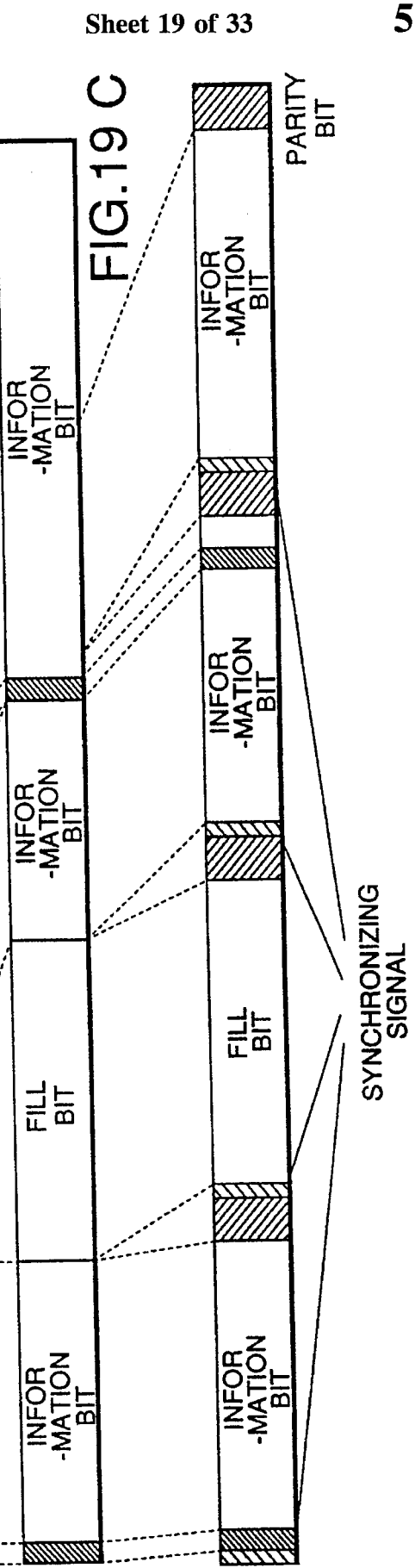

FIG.26 A

VIDEO DATA 1 (SCREEN-IMAGE)

| SCREEN NUMBER (WHEN BEING STORED) | DATA |
|---|---|
| 1 (1) | SCREEN-IMAGE |
| 3 (3) | SCREEN-IMAGE |
| 5 (5) | SCREEN-IMAGE |
| ⋮ | ⋮ |

FIG.26 B

VIDEO DATA 2

| 10 (10) | VIDEO DATA |
|---|---|
| 12 (12) | VIDEO DATA |
| 15 (15) | VIDEO DATA |
| 17 (17) | VIDEO DATA |
| 18 (18) | VIDEO DATA |
| 20 (20) | VIDEO DATA |
| 21 (21) | VIDEO DATA |
| 23 (23) | VIDEO DATA |
| ⋮ | ⋮ |

FIG. 27

| SCREEN NUMBER (WHEN BEING STORED) | DATA |
|---|---|
| 1 (1) | SCREEN-IMAGE |
| 3 (3) | SCREEN-IMAGE |
| 5 (5) | SCREEN-IMAGE |
| 7 (10) | VIDEO DATA |
| 9 (12) | VIDEO DATA |
| 12 (15) | VIDEO DATA |
| 14 (17) | VIDEO DATA |
| 15 (18) | VIDEO DATA |
| 17 (20) | VIDEO DATA |
| 18 (21) | VIDEO DATA |
| 20 (23) | VIDEO DATA |
| ⋮ | ⋮ |

FIG.30

| | SCREEN NUMBER | DATA |
|---|---|---|
| FRAME 1 | 0 | |
| FRAME 2 | 2 | |
| FRAME 3 | 4 | |
| FRAME 4 | 6 | |
| | ⋮ | ⋮ |
| FRAME 32 | 31 | |
| | ⋮ | ⋮ |

FIG.31

| SCREEN NUMBER (STORED) | DATA |
|---|---|
| 0 (0) | |
| 2 (1) | |
| 4 (2) | |
| 6 (3) | |
| ⋮ | ⋮ |
| 30 (15) | |
| 0 (0) | |
| 2 (1) | |
| ⋮ | ⋮ |

IMAGE-INFORMATION STORAGE REGENERATING DEVICE

BACKGROUND OF THE INVENTION

The present invention relates to a image-information storage regenerating device, and more particularly to a video communication system which can collect and store multiplexed data of audio/video and other information from video data communication terminals (e.g., visual telephone sets) according to the recommendation by ITU (International Telecommunication Union) and which allows users to regenerate the stored data through their terminal sets. More particularly, the present invention is related to a video data storage control device for regenerating a video data file stored in a storing/regenerating center (storage device) for video data, and more particularly to a video data regeneration control device which is capable of transmitting stored coded video data from a video data storage and regeneration center (storage device) to an audio-visual (AV) terminal and enabling the terminal to decode the received coded video data and reproduce images thereat, and which is also capable of transmitting stored therein coded video data to a receiving terminal and enabling the terminal to decode the received coded video data and reproduce therefrom the video data.

Recently, besides conventional interactive communication services using telephones and facsimiles, such a communication service has been provided that audio data stored at a center of communication network can be always regenerated through users' terminal sets. On the other hand, with improvement and development of digital communications networks, e.g., ISDN (Integrated Services Digital Network), it has been possible to use video communication services, e.g., visual telephone service. On such background, there is an increasing demand for video delivery services using a database of video information. Such communication services have been locally realized for practical use.

Recently, with improvement and development of digital transmission channels and advancement of image processing technique, it has been expected to develop a method allowing one to effectively use image-information services over high-speed digital transmission networks, a representative of which is ISDN (Integrated Services Digital Network), by applying advanced high-speed digital-signal processing and related LSI technology. Representative image communication services such as visual telephone services and video conference services have been already realized and practically utilized. Lately, such an information delivery service for supplying information to many unspecified users at unspecified times has been expected to appear in practice as a new business.

To supply information to many unspecified users, it is necessary to store information in a storage (recording device), e.g., a host center, and to provide a control system for regenerating information at the many unspecified audio-visual terminals and storing information from the audio-visual terminals into the storage. This system is represented, for example, by an image-information regeneration control device that controls regeneration of image-information from the host center to the audio-visual terminals.

In a conventional image-information regeneration control device, coded image-information is stored with screen (frame) numbers and is transmitted with the same screen (frame) numbers to an audio-visual terminal at which the coded image-information is then decoded and regenerated according to the screen numbers.

The image-information communication service may often transmit a interactive-mode screen (e.g., a service menu or guidance for user) and coded data of different object images in succession to a user terminal and continuously regenerate them at the terminal.

In a conventional image-information transfer system, a center control unit negotiates with a terminal as to decoding capability of the terminal before transmitting coded image-information thereto and, only in case of the terminal having a sufficient decoding capability, it reads and transmits the coded image-information stored together with their screen (frame) numbers to the terminal.

Japanese laid-open patent publication No. 62-188579 describes a stored video data regenerating device for use in a packet communication network for transmitting moving picture information from a moving picture database, which converts video data into video signals adapted to be easily received by user's terminal sets by absorbing variations of delay in transmission of packets over the packet communications network and allows user to get desired video information from the data base at any desired time.

Japanese laid-open patent publication No. 3-132128 describes a stored video data regenerating device that allows for storing messages of video and audio data composed of still-pictures and recorded pictures inputted from users through their terminal devices and allows each user to reproduce a message corresponding to his request on a display screen of his terminal.

Japanese laid-open patent publication No. 4-79655 describes a stored video data regenerating device that has means to register conditions of collecting information from a user's terminal having functions for inputting and outputting video/audio and characters, and that calls the terminal according to the registered information and automatically receives information and stores the collected information as requested by a client.

As a conventional stored image regenerating device there may be designated a device that is described in a reference paper titled "Prototyping of PC-Videophone with Built-in Codec based on Open Architecture" (by Ichizo KIMURA and 7 et al.), the journal of the Institute of Image Electronics Engineers of Japan, 1993, Vol. 22, No. 4, pp. 355–367.

The above-mentioned reference describes how to store and regenerate audio/video data, indicating two possible methods: the first method is directed to store the multiplexed audio/video data as unchanged and the second method is directed to disassemble multiplexed data and store audio/video data as separated from each other. However, the conventional systems prefer the first method from the view point of easier processing of multiplexed data at a center device and describes necessary functions of this method and how to realize said functions.

The present invention pointed out problems of the conventional method of storing audio/video as multiplexed data and provides a novel method that separates media, particularly video (image-information), and stores them as separated from each other in order to solve the problems involved in the conventional systems. Furthermore, the present invention discloses that an excellent video communication system can be constructed by applying therein several new techniques. Practically, the data storage and regenerating device according to the present invention is featured by new functions such as data management by frames, synchronizing by time stamps and adjustment of information amount by inserting fill bits, and which realizes, thereby, so flexible and so high leveled functions that can not be attained by the conventional multiplexed data storing system.

Accordingly, it may be clearly understood that the present invention in its basic conception quite differs from the conventional systems, and it also discloses novel and useful art to solve the problems of the conventional systems.

As described above, the conventional system stores data as multiplexed by the method adopted as an international standard. The data display at the terminal device is, therefore, conducted usually after synchronization of a FEC-frame (forward error correction frame) is established. Namely, an image can not immediately be displayed. The initial. Image is not always encoded by intra-frame mode and may not be self-contained for decoding. Furthermore, the terminal may not well reproduce images because of occurrence of underflow or overflow of its buffer, which may result from that the Storing buffer condition differs from the regenerating buffer condition.

The video data are stored under the control of encoded information amount according to buffer condition of a terminal. The conventional method can not assure the same condition of buffer of a terminal device when storing data and when regenerating data. Any terminal may encounter overflow or underflow of its buffer when regenerating stored video data. Furthermore, in the conventional video regenerating device, such a problem may arise that stored video data can not be regenerated at a terminal if the channel transmission rate to which the terminal is adapted is not compatible with the channel rate at which the data were stored. For instance, said problem may occur when video data stored by a terminal adapted only to a channel rate of B using a basic interface of ISDN is regenerated at a terminal adapted only to a channel rate of 2B.

In video data storing, a transmitting AV-terminal according to the recommendation H.261 encodes successive objective frames by motion compensative inter-frame prediction and sends the encoded video data. When an video data storing center starts storing operation, coded video data by screens, for example, $B_o$-$B_n$ are read-out and stored in a storage such as a host machine. In this case, the screen $B_o$ is encoded by prediction with reference to the frame $B_{-1}$.

In image reproduction, the coded video data, e.g., frames $A_{-3}$-$A_1$ and $B_o$-$B_n$ stored subsequently to the screen $A_{-1}$ are successively read from the video data storage center by the host machine and sent to an AV-terminal. These data maintain an integrity as successive coded video frames and they are, therefore, normally decoded at the AV-terminal.

While the screen $B_o$ is, however, predicted with reference to the screen $B_{-1}$ at the time of data storing (i.e., coding), it will be decoded with reference to the screen $A_{-1}$ that relates to a preceding object in the order of coded video data. Namely, the screen $B_o$ is predicted according to different screens at coding and decoding. As the result, the screen $B_o$ can not normally be reproduced and displayed at the AV-terminal. Furthermore, this may affect the subsequent screens since screens $B_1$-$B_n$ have been dependently coded in succession by inter-frame prediction. The desplayed screen videos may be damaged.

In the conventional image-information regeneration control device, as described above, a screen number (frame number) of video data (frame data) to be transmitted and received by an audio-visual terminal is the same as that of the corresponding video data stored in a storage. Namely, the stored video data with its unchanged screen (frame) number are transmitted to the terminal. For example, when video data are stored in the order of screen (frame) numbers "10, 12, 15, 17 . . . ", corresponding video data to be transmitted are given the same frame numbers "10, 12, 15, 17 . . . ". Accordingly, when such video data are regenerated in succession to a currently displayed image or video data of different object, a discrepancy of screen numbers may occur at a junction between two different image sequences.

For instance, in case of continuously displaying the stored video data in succession to a sequence of screen images, jointed screen (frame) numbers are described as "screen-image (1), screen-image (3), screen-image (5), video data (10), video data (12), video data(15) . . . " which is transmitted without any modification. This causes the audio-visual terminal to regenerate the received video data in the order of their screen (frame) numbers with a discrepancy of screen (frame) numbers between "screen-image (5)" and "video data (10)", i.e., a frame interval corresponding to a split of image sequences. In this case, video data behind the frame interval is regenerated with a delay time.

As described above, the conventional image-information regeneration control device has such a drawback that when a screen-image and/or different kinds of video data are successively transmitted, discontinuity of screen numbers occurs at a junction of the transmitted video data between the last screen (frame) of a preceding video data and the top screen (frame) of a subsequent video data, causing a delay time between the preceding video data and the succeeding video data when they are regenerated at the terminal.

The conventional image-information regeneration control device has to first negotiate with a receiving terminal whether the terminal has sufficient capability to decode the coded video data stored in the device or not. When the decoding capability of the terminal is insufficient, i.e., a minimal frame interval of video data to be decoded by the terminal is, for example, $2/29.97$ seconds (hereinafter described as $2/30$ sec.) which is more than a frame interval of the coded video data stored in a storage of the device, which stores the video data encoded at a frame interval $1/29.97$ seconds (hereinafter described as $1/30$ sec.) according to a coding method based upon recommendation H.261 of ITU (International Telecommunications Union), screen numbers (frame numbers) of the video data(frame data) to be received by the terminal must be "0, 2, 4, 6 . . . " which differ from screen numbers "0, 1, 2, 3 . . . " of the stored coded video data. Consequently, the center control device can not supply the terminal with the coded video data as be unchanged.

The center control device may transmit stored video data only by odd number frames (1, 3, 5 . . . ) to get frame numbers "0, 2, 4, 6 . . . ", but the terminal can not correctly regenerate images because information of each frame is coded as closely related with information of precedent and subsequent frames by inter-frame prediction coding.

As described above, the conventional video data regeneration control device involves a problem that its center control device can not communicate with a terminal not having sufficient decoding capability.

As described above, the conventional multiplexed data storing and regenerating device separates multiplexed data into audio/video and other information, processes respective data and stores or regenerates the data, resulting in arising of a differential delay between audio/video data at the time of their regeneration.

SUMMARY OF THE INVENTION

It is an object of the present invention to provide an image-information storage regenerating device which, unlike the above-mentioned conventional system in which audio/video data are stored as multiplexed data, separates the received data into audio data and video data, processes and stores the video data as video frames (fields) or continuous frame (field) having a data format allowing for image processing to solve problems that may arise at the time of data regeneration; and which is capable of solving the problem of an image that can not immediately be displayed that may occur at regeneration of stored video data; and which is capable of supervising an amount of information and controlling insertion of fill bits to surely prevent occurrence of overflow or underflow of a buffer at a regenerating terminal; and which is capable of matching a data transmission rate of a data sending side at the time of data storing to that of a receiving side so that a receiving terminal can receive and regenerate stored video data even if a channel rate to which the terminal is adapted is not compatible with a channel rate at which the video data were stored.

It is another object of the present invention to provide an image-information storage regenerating device by which video data of an initial screen to be stored are coded in intra-frame coding mode (called intra-mode) to obtain video data coded in intra-mode (intra-coded screen image) of an initial screen that may be correctly reproduced by the receiving terminal.

It is another object of the present invention to provide an image-information storage regeneration device which, in case of reading coded video data from a storage device and successively transmitting different objects of video data to a terminal to successively regenerate the data thereat, is capable of previously rewriting a screen (frame) number of a top video data just after the end of preceding different video data so that the screen (frame) number is consecutive with that of the last screen (frame) number of the preceding video data to eliminate a delay time of video data due to a frame interval, i.e., a discrepancy between screen (frame) numbers of two different video data sequences and to successively decode the video data, and which, in image storage and delivery service using coded video data stored in a center control device, is capable of communicating with any terminal having a low decoding capability by slowly reproducing images thereat.

It is another object of the present invention to provide an image-Information storage regenerating device which attaches a time stamp to every component previous to storing therein the received multiplexed data, i.e., audio/video data and, when regenerating the multiplexed data, absorbs differential delay of different components by using the time stamps so that the audio/video signals may not have any differential delay in their regeneration.

An image-information storage regenerating device according to the present invention splits a multiplex input of audio/video data into separate signals by using data demultiplexing portion, corrects an error of the video data by error correcting portion based upon the method of FEC (forward error correction), extracts a video frame by using video frame extracting portion, assembles a packet with information on multiplexing rate and encoding method, by which audio/video data are stored, by using packet assembling portion, and stores thus prepared data in a storage device, providing thereby the possibility of easily processing the data to solve any problem that may arise at regeneration of video data.

The present invention can provide an image-information storage regenerating device which disassembles a packet according to attached thereto information, establishes synchronization of FEC operation at a receiving terminal for image regeneration by sending a fill frame as need be, and then transmits stored video data to the terminal, assuring thereby smooth and quick representation of stored video data at the terminal; and which regulates an amount of information at stored image regeneration like an image encoder, thereby surely preventing the occurrence of overflow or underflow of a buffer at a regenerating terminal; and which is further capable of matching data transmission rate of the sending side to that of the receiving side so that a receiving terminal can regenerate stored video data even if a channel rate to which the terminal is adapted is not the same as a channel rate at which the video data to be transmitted thereto were stored at the sending side.

In an image-information storage regenerating device according to the present invention, coded video data are decoded by a H.261 decoding portion (video-data decoding portion) and the decoded video data are encoded in intra-mode by a H.261 intra-frame coding portion (intra-frame coding portion). Coded video data of an initial screen before storing pass through the above-mentioned video decoding portion and intra-frame image coding portion to compose an initial screen comprising video data encoded in intra-mode only, i.e., not including video data coded by motion compensative inter-frame prediction method. This eliminates the possibility of disorder of the initial screen at its reproduction at any AV-terminal, assuring correct regeneration of subsequent screens which, therefore, is decoded with reference to the intra-coded initial screen.

An image-information storage regeneration device according to the present invention is provided with a screen number rewriting portion which, in case of successively transmitting two or more different image sequences of coded video data from a storage to an AV-terminal, previously rewrites a series of screen numbers (frame numbers) of a different video data sequence, that indicates a discontinuity with a last screen number of a preceding video data sequence, in such a way that a top screen (frame) number of the different video data sequence may be consecutive with the same increment (frame interval) as of the screen (frame) numbers of the preceding video data sequence but the succeeding screen (frame) numbers of the different video data sequence may keep the same unchanged increment as of the stored screen (frame) numbers of the different video data sequence. This processing enables the AV-terminal to receive the coded video data of different video data sequences with rewritten screen (frame) number and to continuously reproduce the different videos without causing a delay at a junction of the video sequences.

According to the present invention, it is also possible to rewrite screen numbers of any stored video data sequence to be transmitted to a terminal according to a decoding capability of said terminal, thereby the terminal can always receive the coded video data with screen numbers (frame interval) rewritten to be decoded by the terminal.

A multiplexed data storing and regenerating device according to the present invention separates a multiplexed input of audio/video data into respective components by using data demultiplexing portion, corrects an error of the video data by error correcting portion for FEC (forward error correction), extracts a video frame by using video frame extracting portion, assembles a packet with information on multiplexing rate and encoding method for storing audio/video data and attaches a time stamp to the packet by using packet assembling portion, and stores thus prepared data in a storage. When regenerating the multiplexed data, this device can disassemble the packet according to the added thereto information and previously absorb a possible differential delay between audio/video data by using attached thereto time stamps.

To attain the above-mentioned purposes, the present invention was made to provide:

(1) an image-information storage regenerating device comprising a multiplexed data transmitting and receiving portion to receive multiplexed data for storing at host side from a terminal for multiplexing input signals such as audio/video signals, over a data communication network, and to transmit regenerated data; and storage device to store therein multiplexed data of audio/video data, which are receivable by the multiplexed data transmitting and receiving portion for storing and readable by the multiplexed data transmitting and receiving portion for regeneration, wherein the multiplexed data transmitting and receiving portion separates multiplexed data and the storage device stores video data by video frames or continuous frames;

(2) an image-information storage regenerating device which in addition to the above-mentioned device (1), the multiplexed data transmitting and receiving portion is provided with channel data demultiplexing portion to separate an input signal of multiplexed audio/video data into respective components; error correcting portion to correct an error of video data outputted from the channel data demultiplexing portion; video frame extracting portion to extract video frames from video data outputted from the error correcting portion; and packet assembling portion to assemble a packet of video data outputted from the video frame extracting portion and audio data outputted from the channel data demultiplexing portion; and the storage device stores an assembled packet outputted from the packet assembling portion by arranging video data by video frames or continuous frames;

(3) an image-information storage regenerating device as defined above in item (1) and (2), wherein the multiplexed data transmitting and receiving portion is provided with packet disassembling portion to disassemble a packet outputted from the storage device into respective components; fill bit inserting device to optionally insert a fill bit or bits into video data outputted from the packet disassembling portion; error correction frame generating portion to produce error correction frames of video data outputted from the fill bit inserting portion; and channel data multiplexing portion to multiplex video data outputted from the error correction frame generating portion together with data outputted from the packet disassembling portion; and the multiplexed data transmitting and receiving portion can maintain synchronization of error correction frame of the communication terminal for regenerating stored video deta;

(4) an image-information storage regenerating device as defined above in item (1) or (2), wherein the multiplexed data transmitting and receiving portion is provided with packet disassembling portion to disassemble a packet outputted from the storage device into every kind of data; fill bit inserting portion to insert a fill bit or bits into video data outputted from the packet disassembling portion; data amount supervising portion to supervise an information content of video data outputted from the packet disassembling portion and control the fill bit inserting portion; error correction frame generating portion to produce error correction frames of video data outputted from the fill bit inserting portion; and channel data multiplexing portion to multiplex video data outputted from the error correction frame generating portion and data outputted from the packet disassembling portion; and the multiplexed data transmitting and receiving portion can maintain synchronization of error correction frame of the communication terminal for regenerating stored video data;

(5) an image-information storage regenerating device as defined above in item (1) or (2), wherein the multiplexed data transmitting and receiving portion is provided with packet disassembling portion to disassemble a packet outputted from the storage device into respective components; transmission speed matching portion to match transmission rate of the multiplexed data transmitting and receiving portion with video data outputted from the packet disassembling portion; fill bit inserting portion to insert a fill bit or bits into video data outputted from the packet disassembling portion; data amount supervising portion to supervise an information content of video data outputted from the packet disassembling portion and control the fill bit inserting portion; error correction frame generating portion to produce an error correction frame of video data outputted from the fill bit inserting portion; and channel data multiplexing portion to multiplex video data outputted from the error correction frame generating portion together with data outputted from the packet disassembling portion; and the multiplexed data transmitting and receiving portion can maintain synchronization of error correction frame of the communication terminal for regenerating stored video data.

To realize the above-mentioned purposes, the present invention was made to provide an image-information storage regenerating device for controlling a process for transferring video data from a high-speed digital transmission network to a coded video data recording storage and a process for storing said information therein, comprising a receiving portion, a communication control portion and a transmitting portion, characterized in that there are provided with video decoding portion to decode coded video data and intraframe video coding portion to encode in intra-mode the video data decoded by the video decoding portion and which transfers coded video data of an initial screen through the video decoding portion and the intra-frame video coding portion to prepare the video data coded in intra-mode and stores said data in the storage device.

To attain the above-mentioned purposes, the present invention was made to provide: (1) an image-information storage regeneration device for use in a video data communication service to control a process of reading coded video data from a storage device and transmitting the coded video data to an audio-visual terminal (hereinafter referred as AV-terminal) for decoding and regenerating said video data, comprising a video data reading portion, a screen-image reading portion and channel control portion, which is further provided with a screen number rewriting control portion for giving an instruction for rewriting screen numbers showing ordinal numbers of video data units to be transmitted to the AV-terminal, a transmission-frame processing portion for preparing coded video data by rewriting screen numbers of the video data according to the rewriting instruction from the screen number rewriting control portion so as to rewrite a screen number of video data at a split of sequences before transmitting stored coded video data in succession to different object video data to an AV-terminal, assuring thereby continuous reproduction of images without a delay due to a discrepancy of screen numbers between two different video data sequences; (2) an image-information storage regeneration device for use in a video data communication service system using video data stored therein, which comprises a center control unit for storing coded video data, reading and transmitting said coded video data to a terminal for decoding the receiving coded video data and reproducing it as an video data sequence, a screen number rewriting control portion for giving a instruction for rewriting screen numbers showing ordinal numbers of video data to be transmitted by the center control device to the AV-terminal, a transmission-frame processing portion for reading from the stored coded video data and rewriting screen numbers of the video data according to the rewriting instruction from the screen number rewriting control portion to prepare coded video data to be transmitted to the terminal and a terminal-capability control portion for controlling decoding capability of each terminal, and which, in case of the terminal having a minimum frame interval larger than the frame interval of the stored coded video data, rewrites screen numbers of the read-out coded video data and transmits the coded video data to the terminal to make it possible to communicate with the terminal in such a way to slowly reproduce images at the terminal.

To attain the above-mentioned purposes, the present invention was made to provide:

(1) An image-information storage regenerating device for storing multiplexed data of audio/video and other information and regenerating stored data from any terminal, wherein a multiplexed data transmitting and receiving portion is provided to eliminate a differential delay arising between different components by using a time stamp attached to stored multiplexed data;

(2) an image-information storage regenerating device, comprising a multiplexed-data transmitting and receiving portion to receive multiplexed data for storage at host side from the terminal for multiplexing input signals of audio/video and other information, over a network and transmit regenerated data, and a storing portion to store therein multiplexed data of audio/video and other information received by the multiplexed data transmitting and receiving portion and to allow reading therefrom the stored data for regeneration, characterized in that the multiplexed data transmitting and receiving portion attaches a time stamp to each component of the multiplexed data to be stored in the storage device and, when regenerating the multiplexed data, absorbs a differential delay of the components according to the time stamps so that no differential delay of the components may arise in regeneration of the multiplexed data; and (3) an image-information storage regenerating device, comprising a channel data demultiplexing portion to split multiplexed input signal into different respective components, e.g., audio/video and other information; an error correcting portion to correct an error of video data outputted from the channel data demultiplexing portion; a time stamp generating portion to generate a time stamp according to an octet timing signal outputted from the channel data demultiplexing portion; a video frame extracting portion to extract a video frame from video data outputted from the error correcting portion and to identify a time stamp of video data from time stamp data outputted from the time stamp generating portion; a packet assembling portion to produce a packet by arranging video data and a time stamp outputted from the video frame extracting portion, a time stamp outputted from the time stamp generating portion and audio data outputted from the channel data demultiplexing portion; a storage device to store a packet outputted from the packet assembling portion; a packet disassembling portion to receive a packet outputted from the storage device and disassemble it into each component data and an attached thereto time stamp; a data processing portion to make some due processing of each component data outputted from the packet disassembling portion; a differential delay absorbing portion to absorb a differential delay of different components according to corresponding time stamps outputted from the data processing portion; and a channel data multiplexing portion to multiplex data components outputted from the differential delay absorbing portion; whereby a possible differential delay of the processed component data can be absorbed.

BRIEF DESCRIPTION OF DRAWINGS

The present invention will become more fully understood from the detailed description given hereinbelow and the accompanying drawings which are given by way of illustration only, and thus, are not limitative of the present invention and wherein:

FIGS. 19A, 19B, and 19C are illustrative of video data between modules of the transmitter shown in FIG. 18.

FIGS. 26A and 26B are an explanatory view showing a correlation between screen (frame) numbers of video data stored.

FIG. 27 is an explanatory view 1 showing a correlation between screen (frame) numbers of stored video data and screen (frame) numbers of video data to be transmitted by an image-information storage regeneration device according to the present invention.

FIG. 30 is a view showing a state of data stored in a video data storing portion of an image-information storage regeneration device according to the present invention.

FIG. 31 is a view showing an example of transmitted frames shown in FIG. 30.

PREFERRED EMBODIMENT OF THE INVENTION

Figure 1:
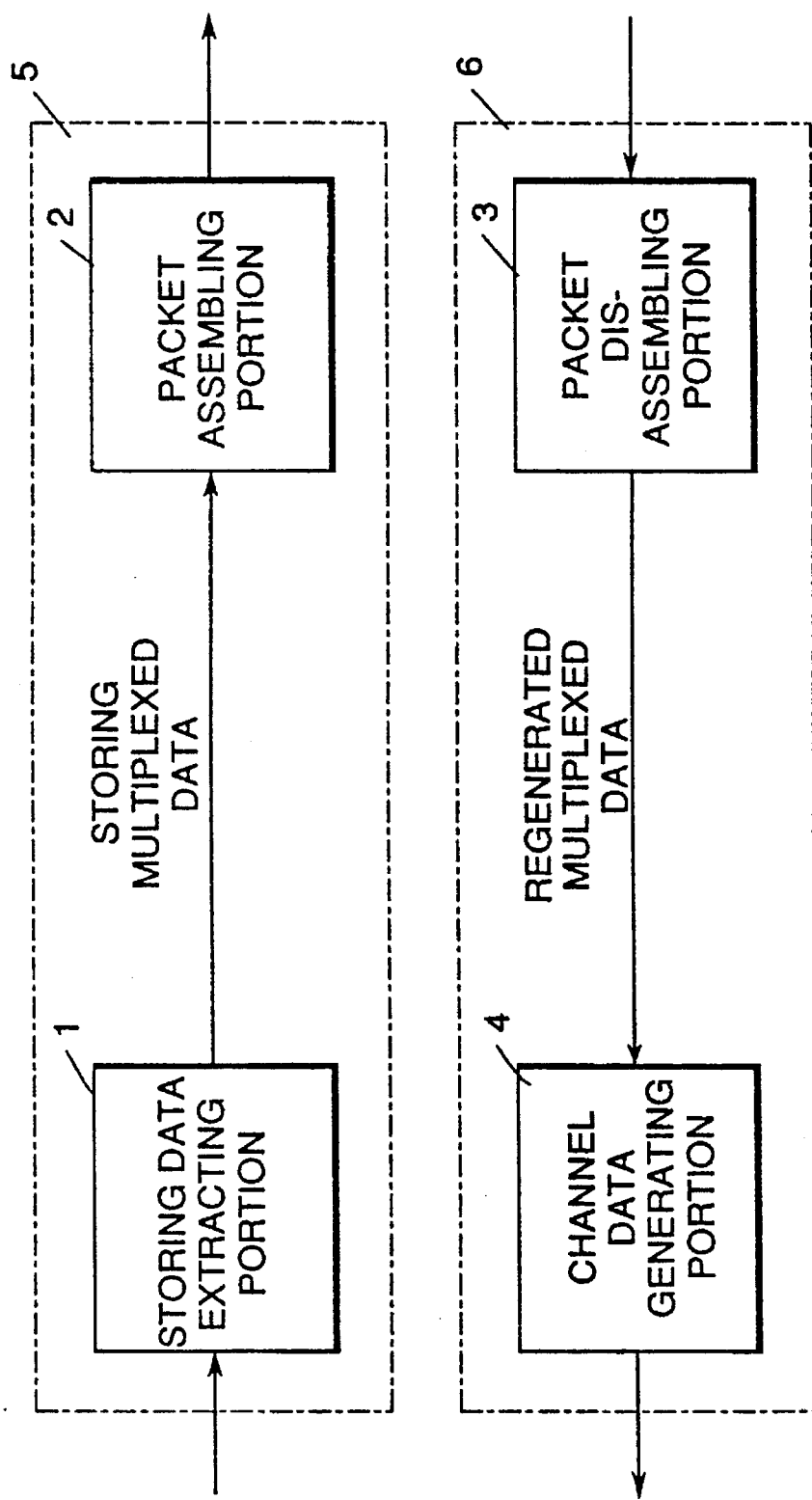
FIG. 1 is a construction view of a conventional multiplexed data transmitting and receiving portion.

FIG. 1 is a construction view of a conventional multiplexed data transmitter and receiver device. In FIG. 1, 1 is a storing data extracting portion, 2 is a packet assembling portion, 3 is a packet disassembling portion, 4 is a channel data generating portion, 5 is a multiplexed data receiving portion and 6 is a multiplexed data transmitting portion.

The storing data extracting portion 1 extracts specified multiplexed data from the received channel multiplexed data according to an instruction of a system control portion. The packet assembling portion 2 assembles a packet from the received multiplexed data according to an instruction of the system control portion. The packet disassembling portion 3 extracts reproducible multiplexed data from the packet outputted by the storage device. The channel data generating portion 4 generates channel multiplexed data from multiplexed data outputted by the packet disassembling portion according to an instruction of the system control portion.

FIGS. 2A and 2B show a conventional channel data multiplexing format that is used for multiplexing data, e.g., data for use in visual telephone service. This format method is designated as an international standard and, therefore, can assure the interconnectability of, e.g., visual telephones. As shown in FIGS. 2A and 2B, the format includes areas 11 and 12 allocated respectively for audio data and video data, a frame synchronization bits 13 and bits 14 for interchange of capability-command between terminals. An order of sending data into a communication circuit is indicated with numeral 15. Data multiplexing conditions can always be changed by using capability-command communication bits 14.

Figure 2:
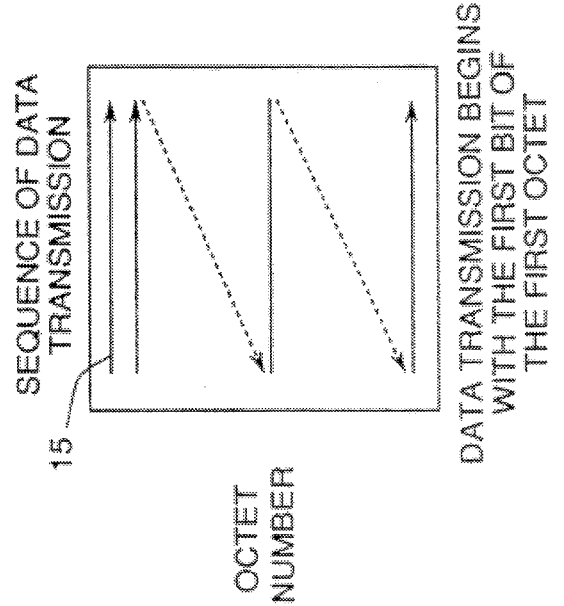
FIGS. 2A and 2B show a conventional multiplexed channel data format.
Figure 2:
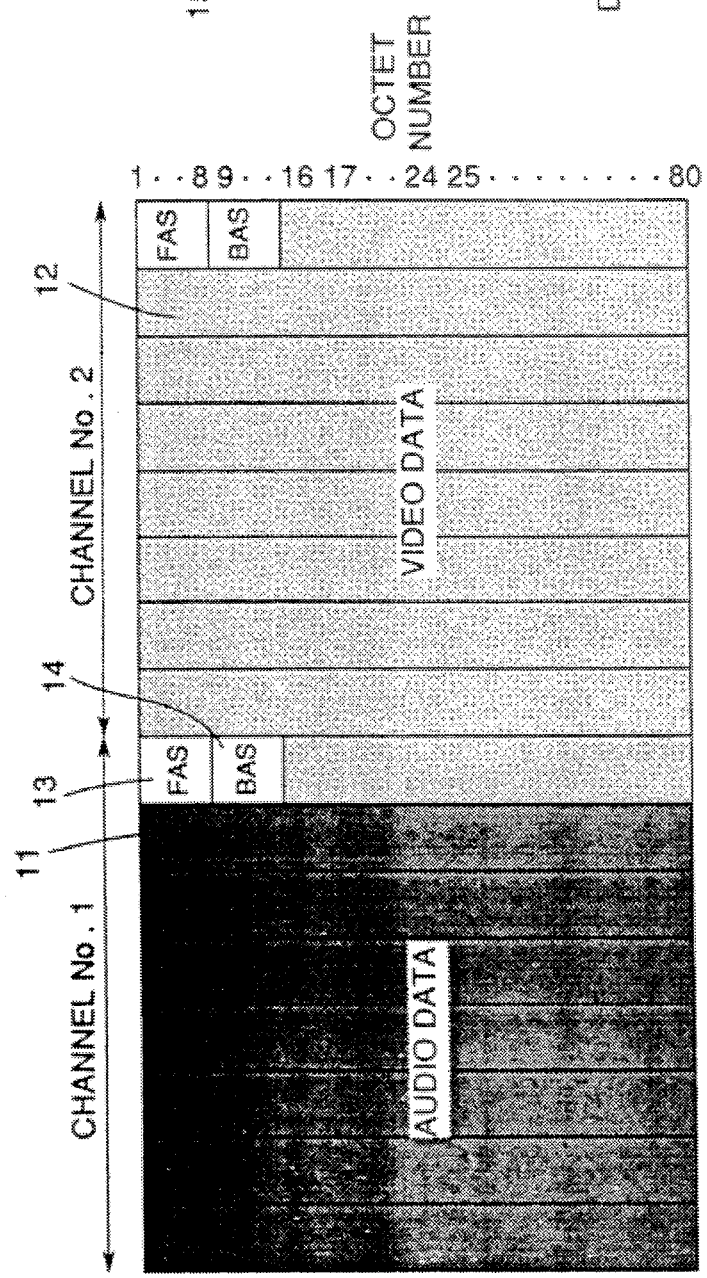
Figure 3:
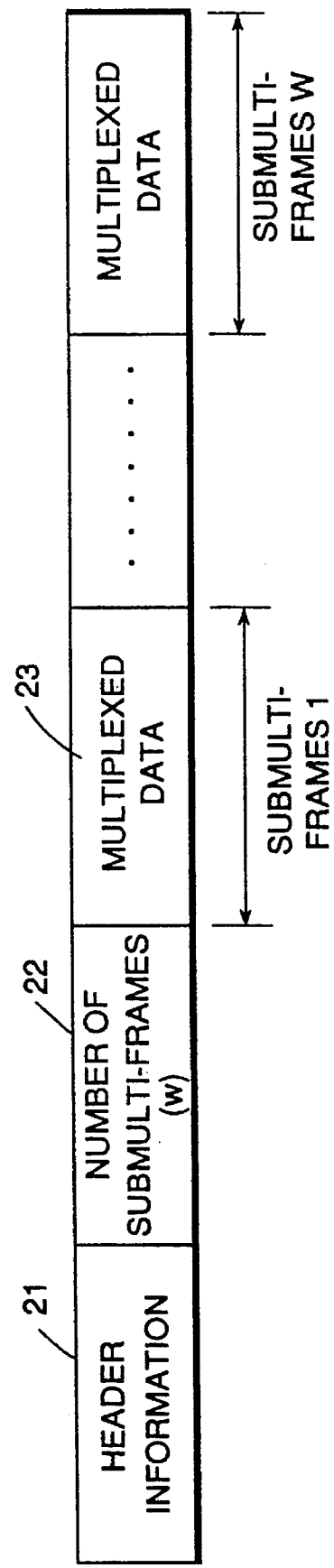
FIG. 3 shows a conventional stored packet format.

FIG. 3 shows a conventional format of a packet to be stored. A header 21 contains information on a storing transmission rate, multiplexing rate and a data encoding method. Numeral 22 denotes a quantity of sub-multiframes comprised of packets, and numeral 23 indicates multiplexed data produced by using the format shown in FIG. 2.

In storing, channel multiplexed data coming from a network is received by the data extracting portion 1 that extracts therefrom multiplexed data to be stored and transfers the extracted data to the packet assembling portion 2. The packet assembling portion 2 assembles packets from the extracted multiplexed data according to the packet format of FIG. 3. A header of the format includes information on the transmitted data multiplexing rate and their encoding method. The packets are transferred as packet data to the storage device.

In regeneration, the packet data from the storage device is received by the packet disassembling portion 3 that informs the system control portion of the header information of each packet. The system control portion 3 directs the channel data generating portion 4 to match the operating mode of a terminal at storing side with that of a terminal at regenerating side by using BAS 14 shown in FIG. 2. After matching is realized by the channel data generating portion, the packet disassembling portion 3 disassembles the packets and transfers the multiplexed data for regeneration to the channel data generating portion 4 that in turn rewrites FAS 13 and BAS 14 (FIG. 2) of the received multiplexed data and sends the prepared channel multiplexed data into the communication network.

Figure 4:
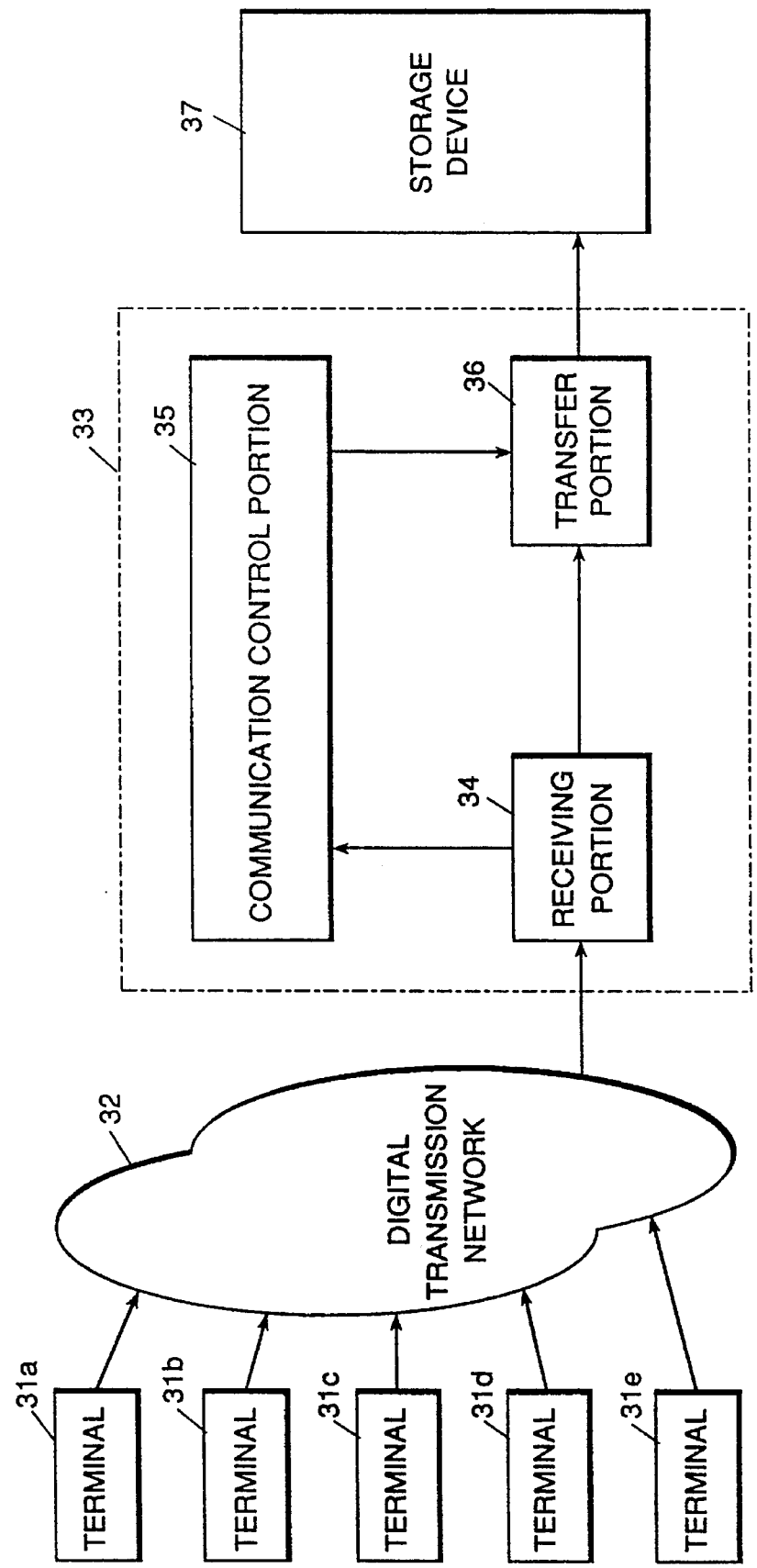
FIG. 4 is a construction view of a conventional image-information storage control system.

FIG. 4 shows a configuration of a conventional image-information storage control system which includes terminals 31a–31e, a digital transmission network 32, an video data storage control device 33, a receiving portion 34, a communication control portion 35, a transfer portion 36 and storage (recording) portion 37. At present, the video data storage control device is intended to be connected with audio-visual terminals (hereinafter called as AV-terminal) based upon the recommendation of ITU-T (International Telecommunication Union Telecommunication Standardization Sector). The video data coding will conform to the system defined by the recommendation H.261.

Figure 5:
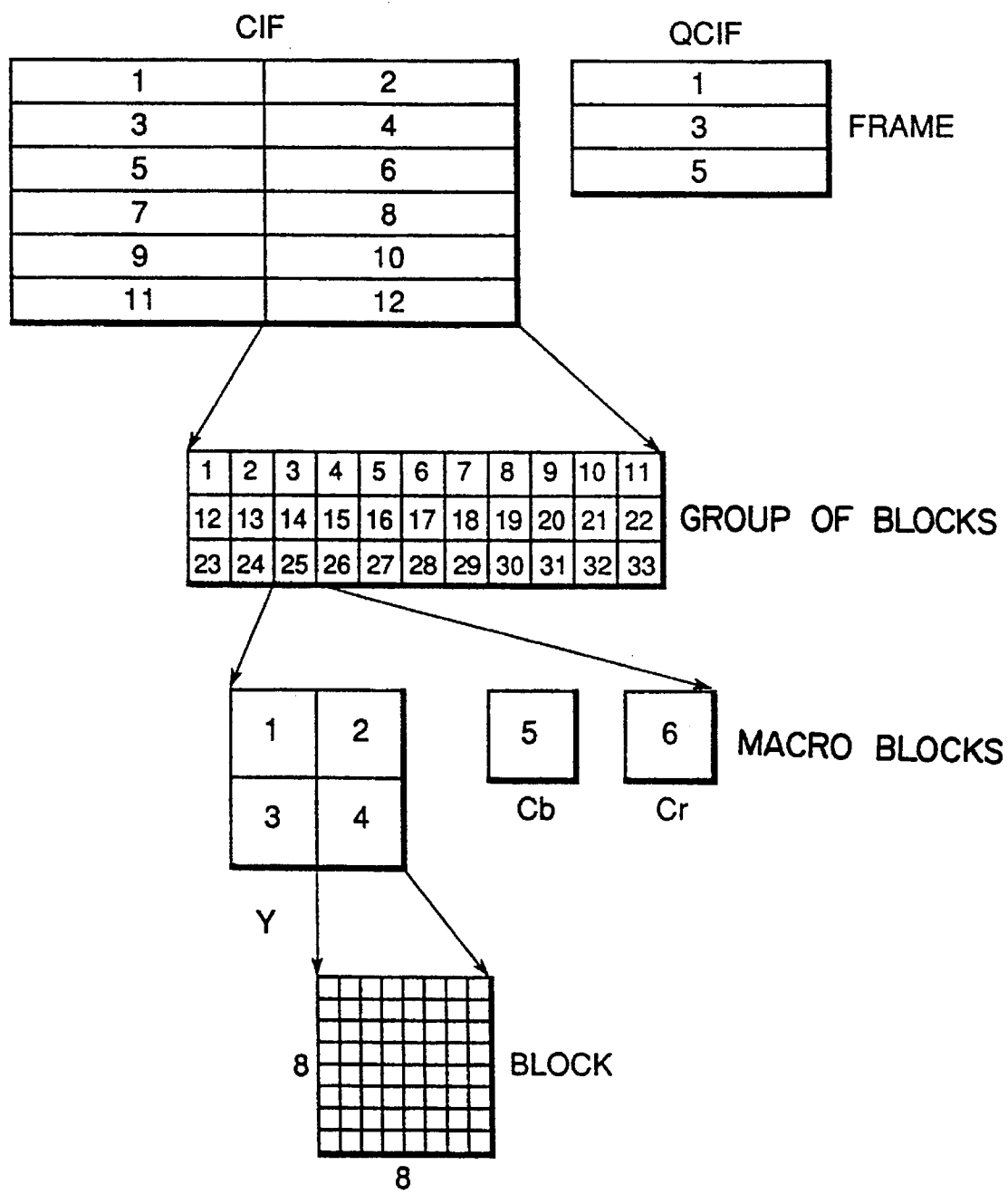
FIG. 5 is a view for explaining a hierarchical structure of conventional image data.

As shown in FIG. 4, the conventional image-information storage control device is comprised of the communication control portion 35, the receiving portion 34 and the transfer portion 36. When a storing start instruction is given from the communication control portion 35, coded video data received by the receiving portion 34 are transferred through the transfer portion 36 to the storage device 37 (recording device like a host machine). The transfer operation is ended with a storing end instruction. The coded video data, as mentioned above, are video data according to the recommendation H.261. This coding method will be described below:

FIG. 5 shows a hierarchical structure of coded video data according to the recommendation H.261. The hierarchy may be supposed as two-dimensionally divided units for coding within a frame of video data, i.e., a video frame (frame), a group of blocks (GOB), a macro block (MB) and a block in descending order. Among them, the video frame and the group of blocks include, respectively, a self-synchronizing information in terms of a unique word (PSC, GBSC) whereby a decoder can recover synchronization at the beginning of communication and in event of occurrence of transmission error. Accordingly, each of these two units may be considered as a transmissible structure unit of coded data.

Figure 6:
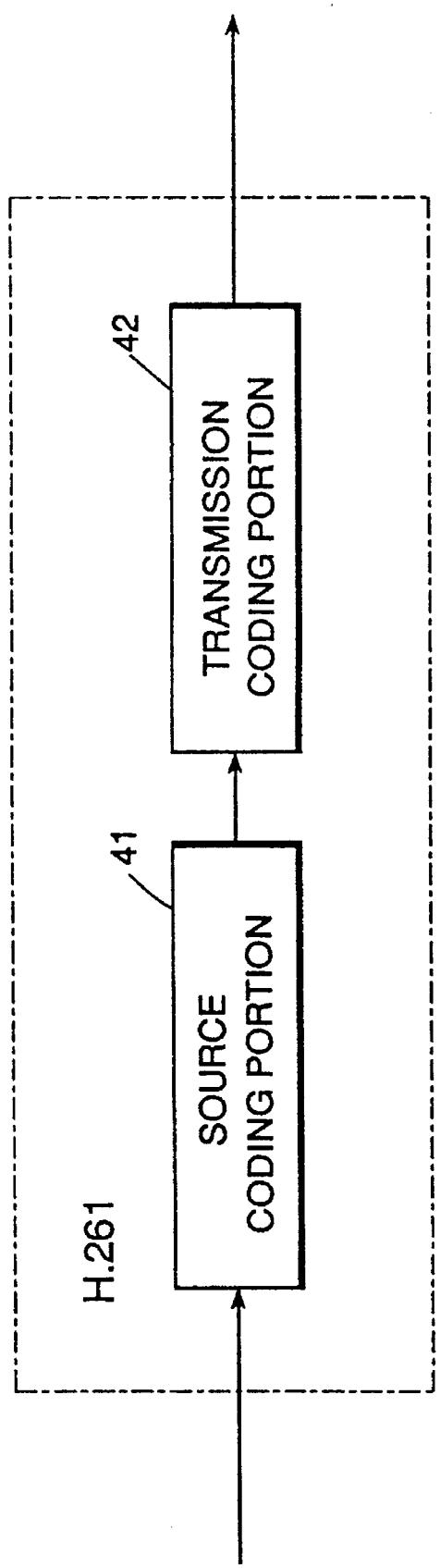
FIG. 6 is a construction view of a conventional coding portion.

FIG. 6 is a construction view of a coder according to the recommendation H.261, which includes an source coding portion 41 and a transmission coding portion 42. The recommendation H.261 defines that a coder is provided with a source coding portion 41 for producing coded data with a reduced amount of information contained in a video and a transmission coding portion 42 that makes the coded data adapted to the transmission line by giving them resilience against transmission error and inserting dummy information for absorbing variation of an information amount of coded data after coding. The transmission coding portion 42 mainly performs forward error correction (FEC) coding of source coded image data.

Figure 7:
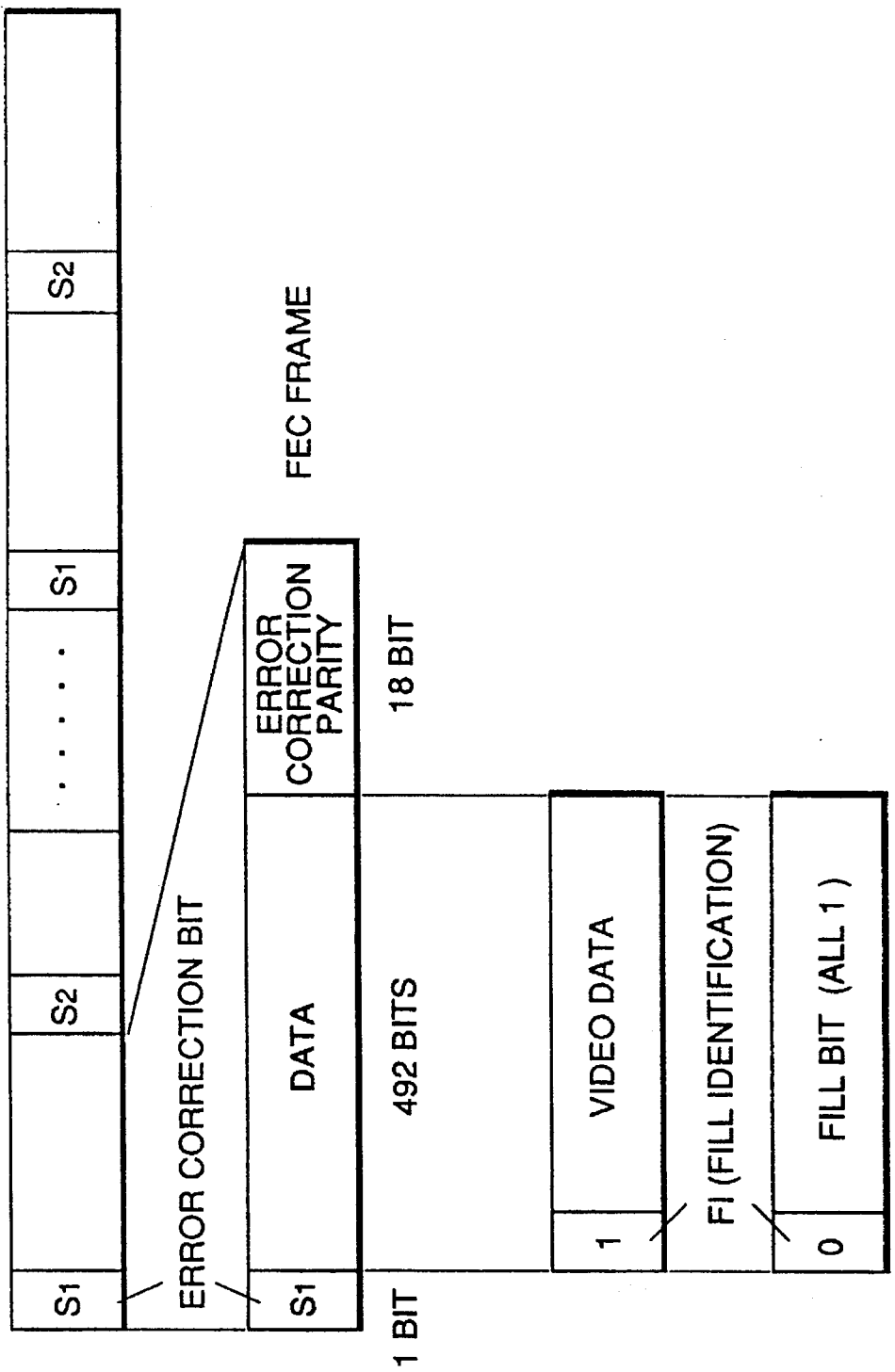
FIG. 7 is a view for explaining conventional error correction frame.

FIG. 7 shows a structure of an error correction frame. The recommendation H.261 uses codes of (511, 493) BCH-code (Bose Chaundhuri Hocquenghem code). Forward error correction coded data are made up of an error correction frame (FEC frame) which is composed of an error correction frame bit (1 bit) for synchronizing a FEC frame according to a synchronization bit pattern, a fill identifier (Fi) (1 bit), 492 bits of coded image data or fill bits (data of all 1) and 18 bits of error correction parity. The coded data thus prepared are then transmitted.

Figure 8:
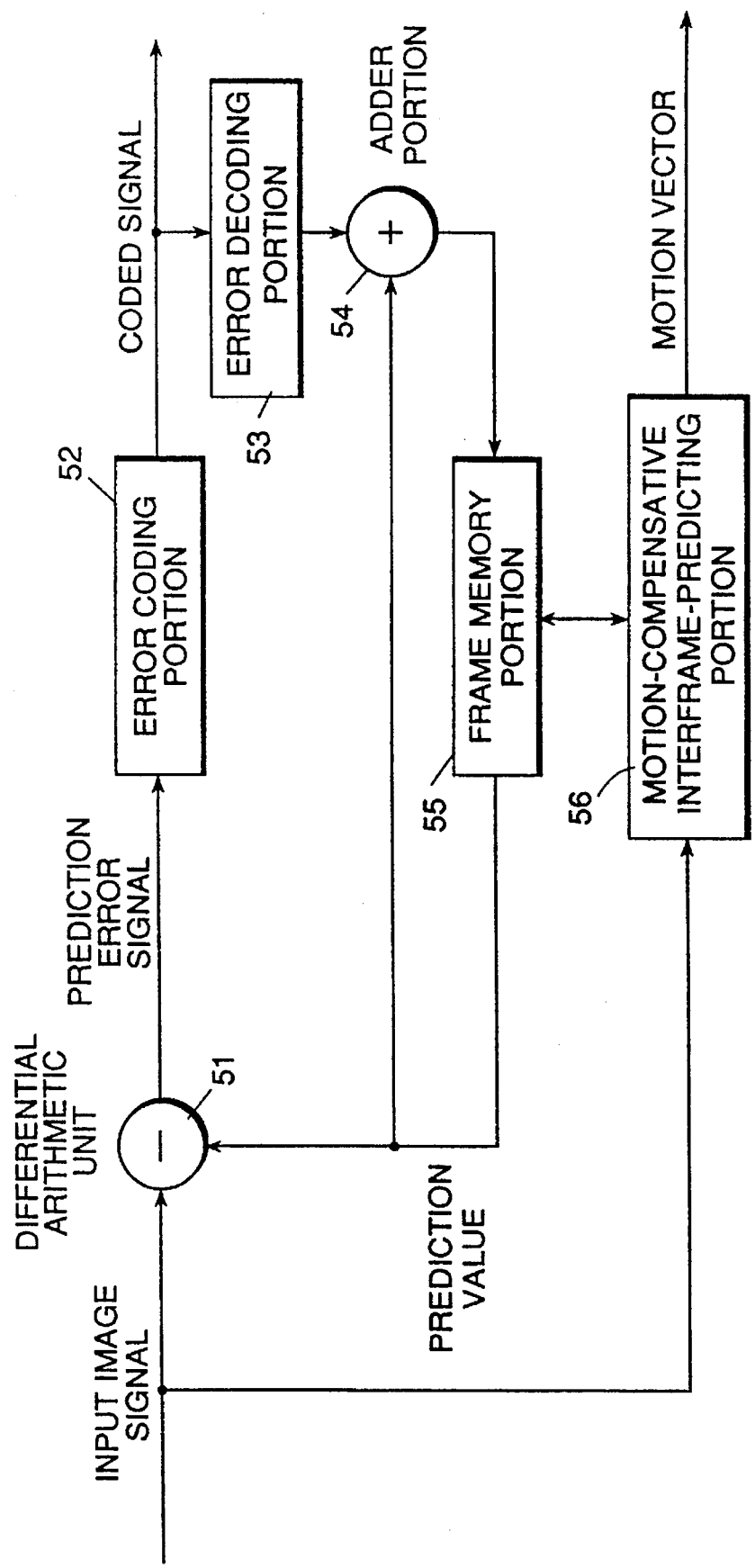
FIG. 8 is a construction view for explaining a conventional motion-compensated interframe predictive coding.

FIG. 8 shows a structure of a motion compensative inter-frame prediction coding system which includes a differential arithmetic unit 51, an error coding portion 52, an error decoding portion 53, an adder portion 54, a frame memory portion 55 and a motion compensative inter-frame predicting portion 56.

Coding algorithm according to the recommendation H.261 is such that video data is coded by hybrid image coding method which is a combination of motion compensative inter-frame prediction and intra-frame orthogonal transform coding. In the hybrid coding system, an information content of video data is reduced by using motion compensative inter-frame prediction and video data can be alternatively encoded in intra-mode (for coding within a frame only) that means refreshing. This intra-mode is applied at specified time intervals to prevent occurrence of a mismatch between a sending side and a receiving side due to calculation error or transmission error, and that is also useful in case when the coding frame does not have much correlation with a preceding one. The hybrid coding system encodes a series of images mainly by inter-frame motion compensative prediction.

Figure 9:
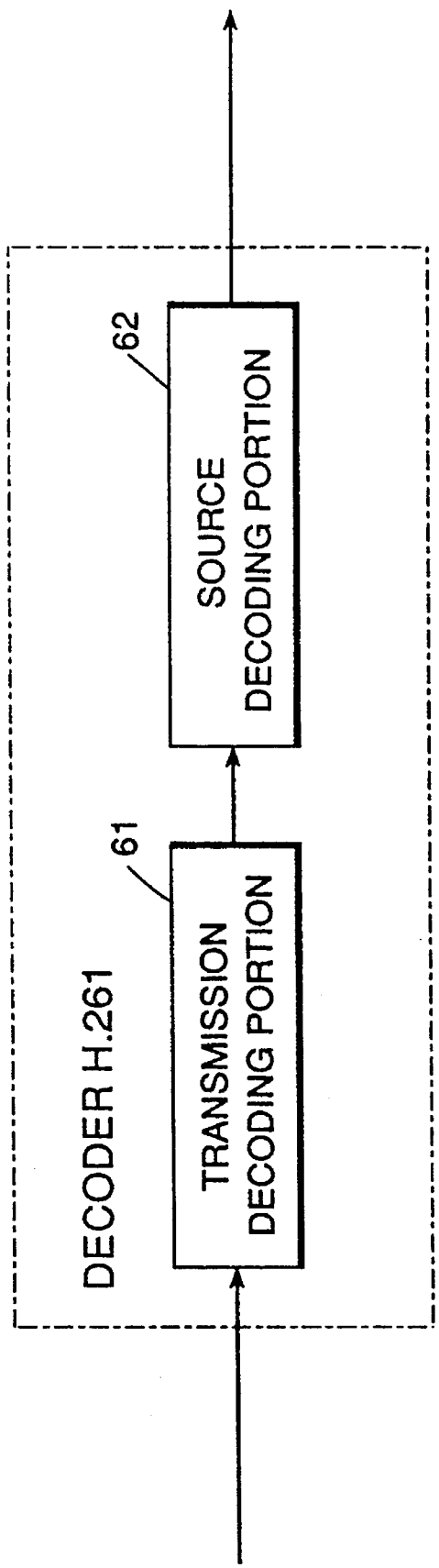
FIG. 9 is a construction view of a conventional decoder.

FIG. 9 is a construction view of a decoder that includes a transmission decoding portion 61 and a source decoding portion 62. Decoding method according to the recommendation H.261 has a flow chart reverse to that of the fore-described coding methods according to the same recommendation.

Figure 10:
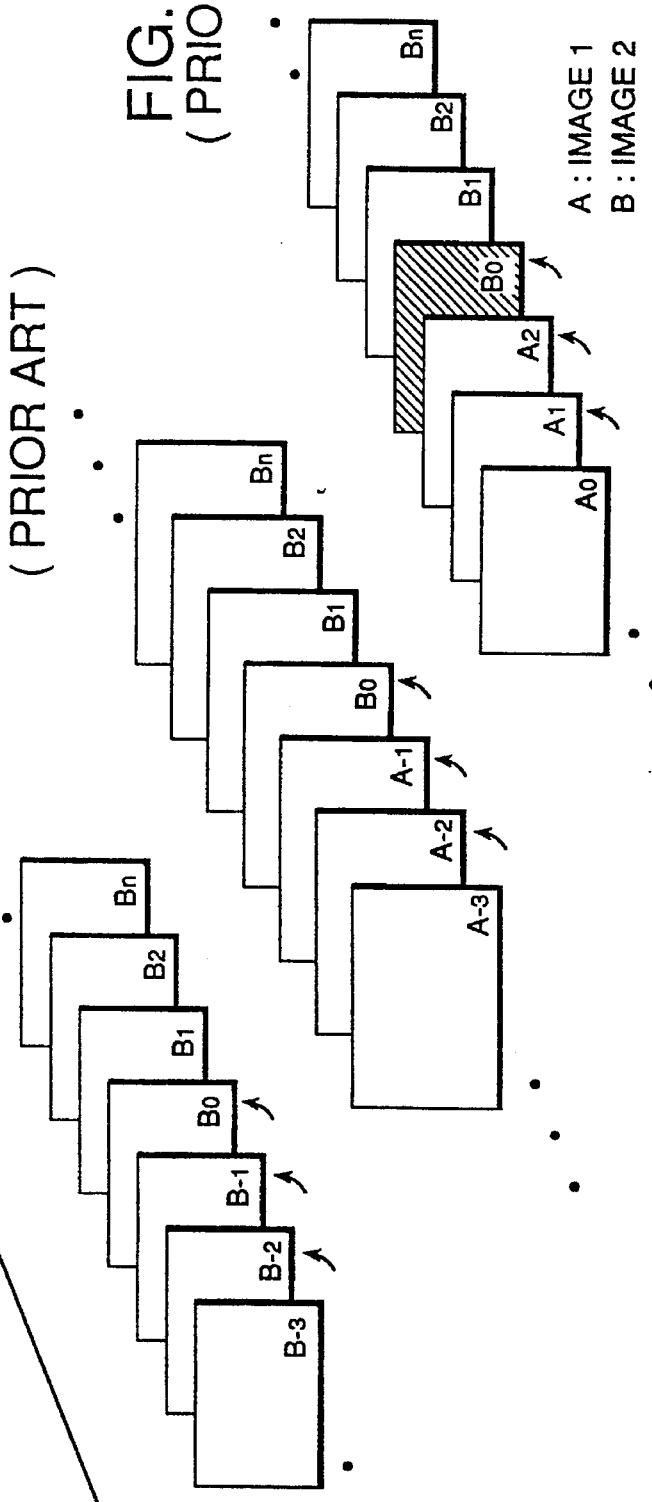
FIGS. 10A, 10B and 10C are a view for explaining a principle of motion-compensated interframe predictive coding method.

In video data storing, a transmitting AV-terminal according to the recommendation H.261 encodes successive objective frames by motion compensative inter-frame prediction and sends the encoded video data as shown in FIG. 10A. When an video data storing center starts storing operation, coded image data by screens, for example, $B_o$-$B_n$ as shown in FIG. 10A are read-out and stored in a storage such as a host machine. In this case, the screen $B_o$ is encoded by prediction with reference to the frame $B_{-1}$.

In image reproduction, as shown in FIG. 10B, the coded video data, e.g., stored frames $A_{-3}$-$A_1$ and $B_o$-$B_n$ are successively read from the host machine by the video data storage center and sent to an AV-terminal. These data maintain an integrity of coded video data and they are, therefore, normally decoded at the AV-terminal.

While the screen $B_o$ is, however, predicted with reference to the screen $B_{-1}$ at the time of data storing (i.e., coding), it will be decoded with reference to the screen $A_{-1}$ that becomes a preceding object at the time of video decoding. Namely, the screen $B_o$ is predicted according to different screens at coding and decoding. As the result, the screen $B_o$ can not correctly be reproduced and displayed at the AV-terminal. Furthermore, this may affect the subsequent screens since screens $B_1$-$B_n$ have been coded in succession by inter-frame prediction. The screen images may be damaged.

Figure 11:
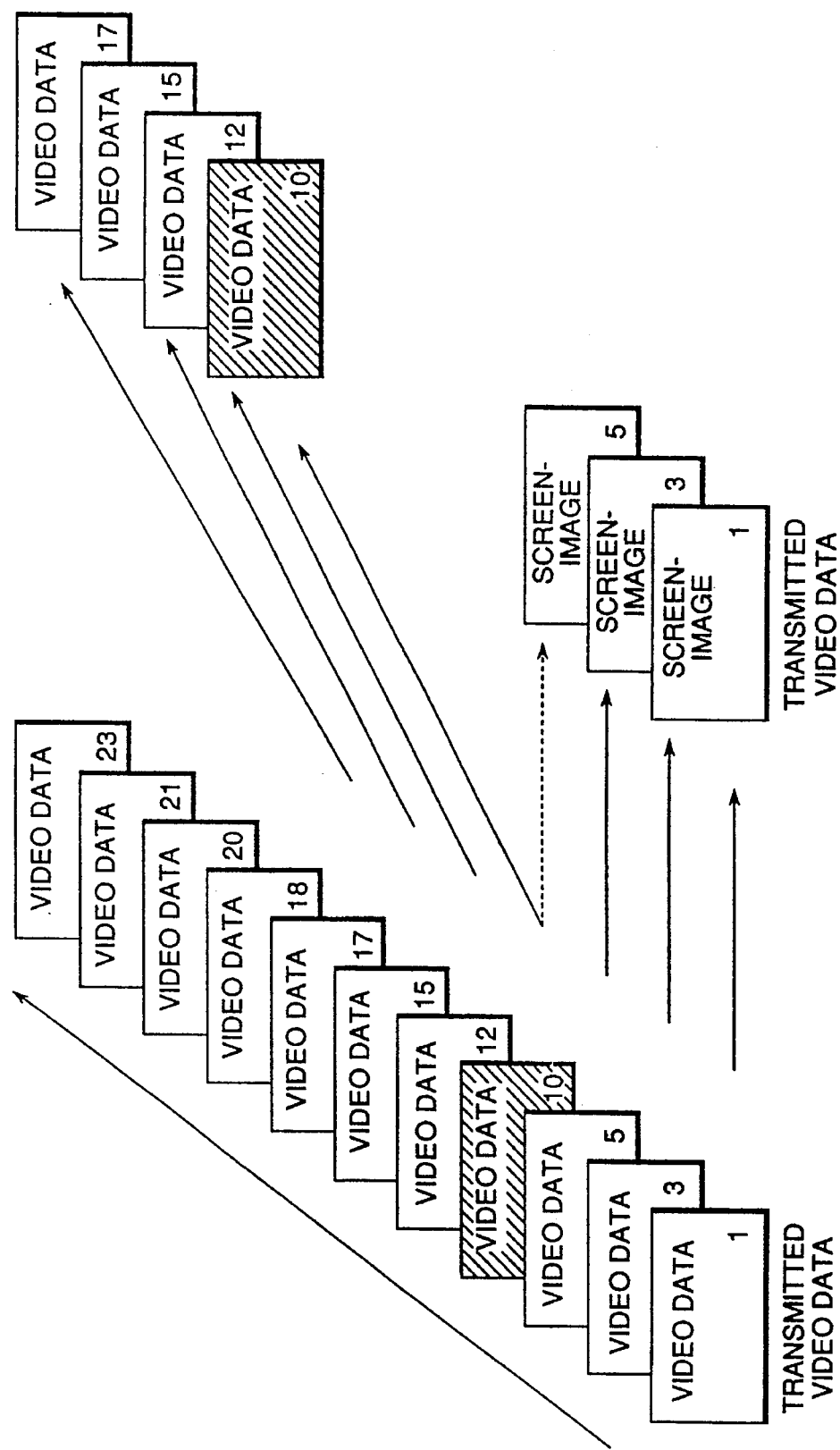
FIG. 11 is a view for explaining a correlation between a transmitted and regenerated video data according to a conventional image-information regeneration control device.

In the conventional image-information regeneration control device, as described above, a screen number (frame number) of video data (frame data) to be transmitted and received by an audio-visual terminal is the same as that of the corresponding video data stored in a storage. Namely, the stored video data with its unchanged screen (frame) number are transmitted to the terminal. For example, as shown in FIG. 11, when video data are stored in the order of screen (frame) numbers "10, 12, 15, 17 ... ", corresponding video data to be transmitted are given the same frame numbers "10, 12, 15, 17 ... ". Accordingly, when such video data are regenerated in succession to a currently displayed image or video data of different object, a discrepancy of screen numbers may occur at a junction between two different video sequences.

For instance, in case of continuously displaying the stored video data in succession to a sequence of screen images as shown in FIG. 11, jointed screen (frame) numbers are described as "screen-image (1), screen-image (3), screen-image (5), video data(10), video data (12), video data(15) ... " which is transmitted without any modification. This causes the audio-visual terminal to regenerate the received video data in the order of their screen (frame) numbers with a discrepancy of screen (frame) numbers between "screen-image (5)" and "video data (10)", i.e., a frame interval corresponding to a split of image sequences. In this case, video data behind the frame interval is regenerated with a delay time.

Figure 12:
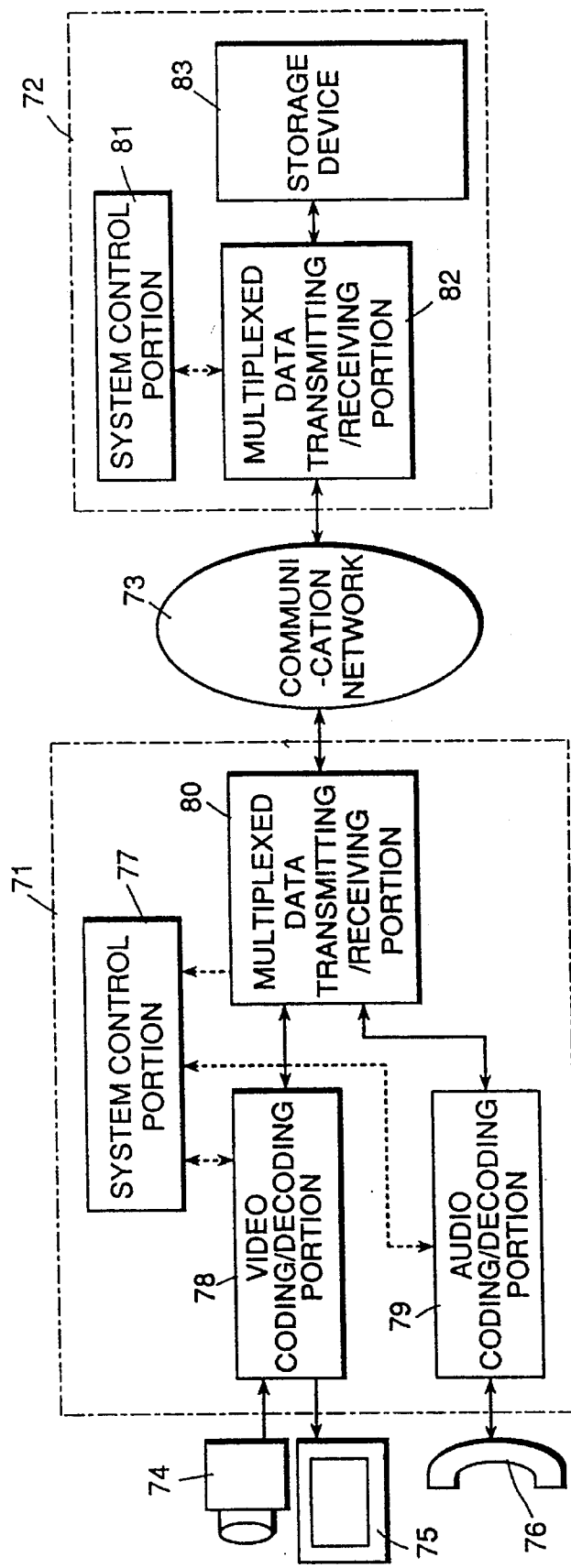
FIG. 12 is a construction view for explaining an image-information storage regenerating device embodying the present invention.

Referring to drawings, a preferred embodiment of the present invention will be described as follows: FIG. 12 is a construction view for explaining an example of an image-information storage regenerating device according to the present invention. There are shown a communication terminal 71, a communication host 72, a communication network 73 (e.g., ISDN), an image input camera 74, an image output monitor 75, an audio input-output handset 76, a terminal system control portion 77, a video coding/decoding portion 78, an audio coding/decoding portion 79, a multiplexed data transmitting and receiving portion 80 of the communication terminal 71 for multiplexing encoded audio/video data and control information, and sending multiplexed data to a channel, a host system control portion 81, a multiplexed data transmitting and receiving portion 82 of the host 72 for demultiplexing control data from multiplexed data and multiplexing the demultiplexed control data, and a storage device 93 for storing data.

Moving-pictures taken by an image input camera 74 of a communication terminal 71 are encoded by inter-frame prediction by the video coding/decoding portion 78 while audio signals inputted through the handset 76 are encoded by the audio coding/decoding portion 79. The coded video data are multiplexed together with the coded audio data and control information by the multiplexed data transmitting and receiving portion 80 and transmitted over the communication network 73 to the host 72. At the host side, the multiplexed data sent from the communication terminal 71 are received by the multiplexed data transmitting and receiving portion 82 whereby packet data to be stored is formed from the received multiplexed audio/video data and transferred to the storage device 83 wherein the packet data are stored in the form of suitable files, i.e., the video data are stored as arranged frame by frame or continuous frames.

The stored data are read from the storage device 83 by the request of a user or the host and transferred to the multiplexed data transmitting portion 82 of the host 72, which, according to an instruction given by the system control portion 81, rewrites the control information of the data, that has been stored as unchanged, and then transmits the data with the new control information over the communication network to the communication terminal 71. At the terminal side, the multiplexed data with the rewritten control information from the host side are received by the multiplexed data receiver portion 80 that splits the multiplexed data into the control information, audio/video data and sends the control information to the system control portion 77.

The coded video data received and demultiplexed by the multiplexed data transmitting and receiving portion 80 are transferred to the video coding/decoding portion 78 that decodes the video data according to an instruction of the system control portion 77 and displays moving-pictures on a display screen of the monitor 75. The demultiplexed audio data are decoded and regenerated by the audio coding/decoding portion 79 and outputted through the handset 76. Since communication over the channel is always conducted in two-ways during both 'store' and 'regenerate' operations, the control information can be transmitted to and from the terminal irrespective of existence or absence of the video data while the channel is kept ON therebetween.

Figure 13:
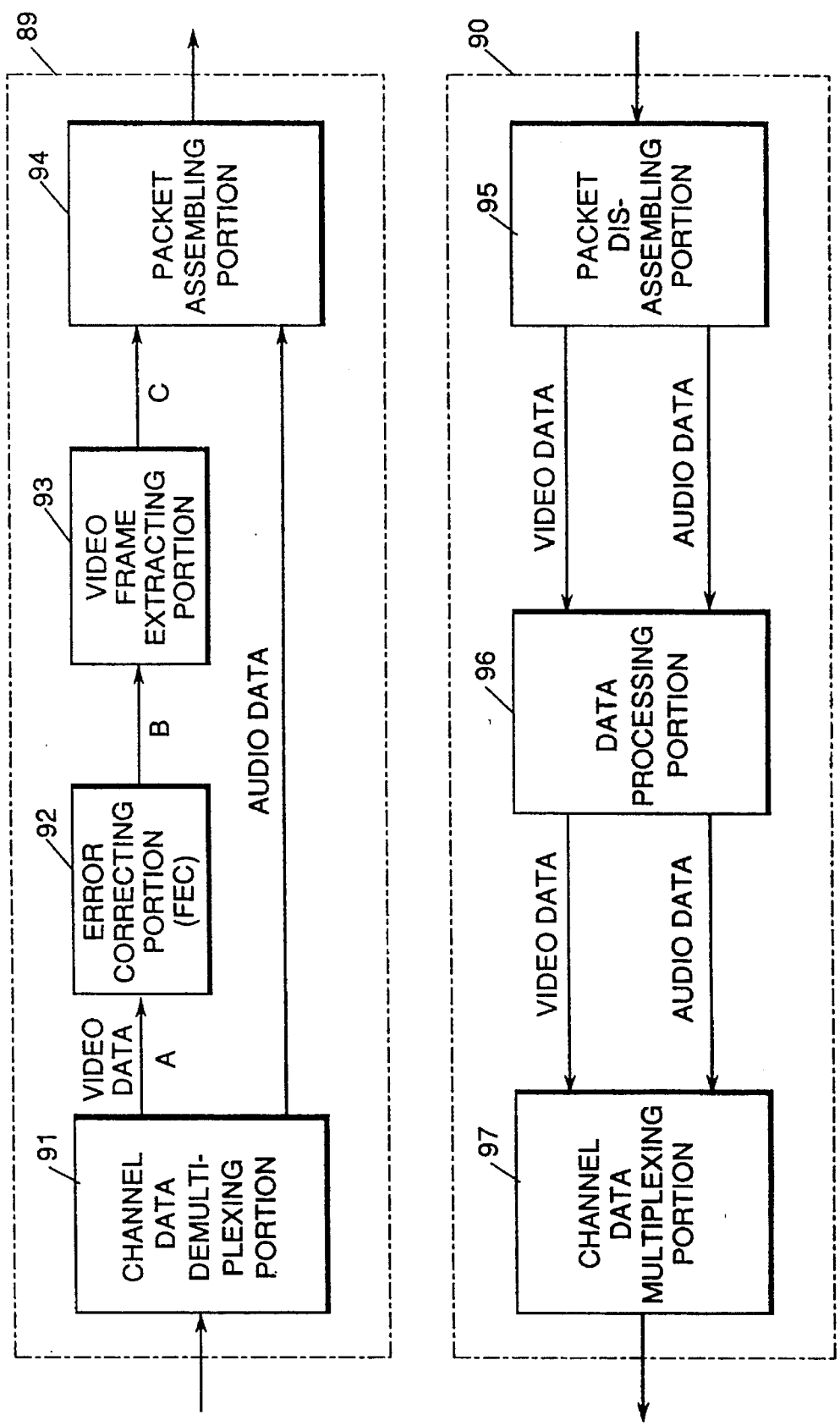
FIG. 13 is a construction view of a multiplexed data transmitting and receiving portion of an image storage and communication system.

FIG. 13 is a construction view of a multiplexed data transmitter and receiver device. In FIG. 13, 89 is a receiving portion of the multiplexed data transmitter and receiver device, 90 is a transmitting portion of the multiplexed data transmitter and receiver device, 91 is a channel data demultiplexing portion, 92 is an error correcting portion according to forward error correction (FEC) control system, 93 is a video frame extracting portion, 94 is a packet assembling portion, 95 is a packet disassembling portion, 96 is a data processing portion and 97 is a channel data multiplexing portion.

The channel data demultiplexing portion 91 separates received channel multiplexed data into different components such as audio/video data and other information according to an instruction of a system control portion (not shown). The error correcting portion 92 performs error correcting operation on video data outputted from the channel data demultiplexing portion 91. The video frame extracting portion 93 extracts a video frame from the error corrected data. The packet assembling portion 94 produces a packet by collecting the video frame from the video frame extracting portion 93 and audio data from the channel data demultiplexing portion 91. The packet disassembling portion 95 demultiplexes a packet read from a storage device into audio/video data. The data processing portion 96 performs some due processing operation on the data outputted from the packet disassembling portion 95 and the channel data multiplexing portion 97 produces channel multiplexed data from the data outputted from the data processing portion 96.

Figure 14:
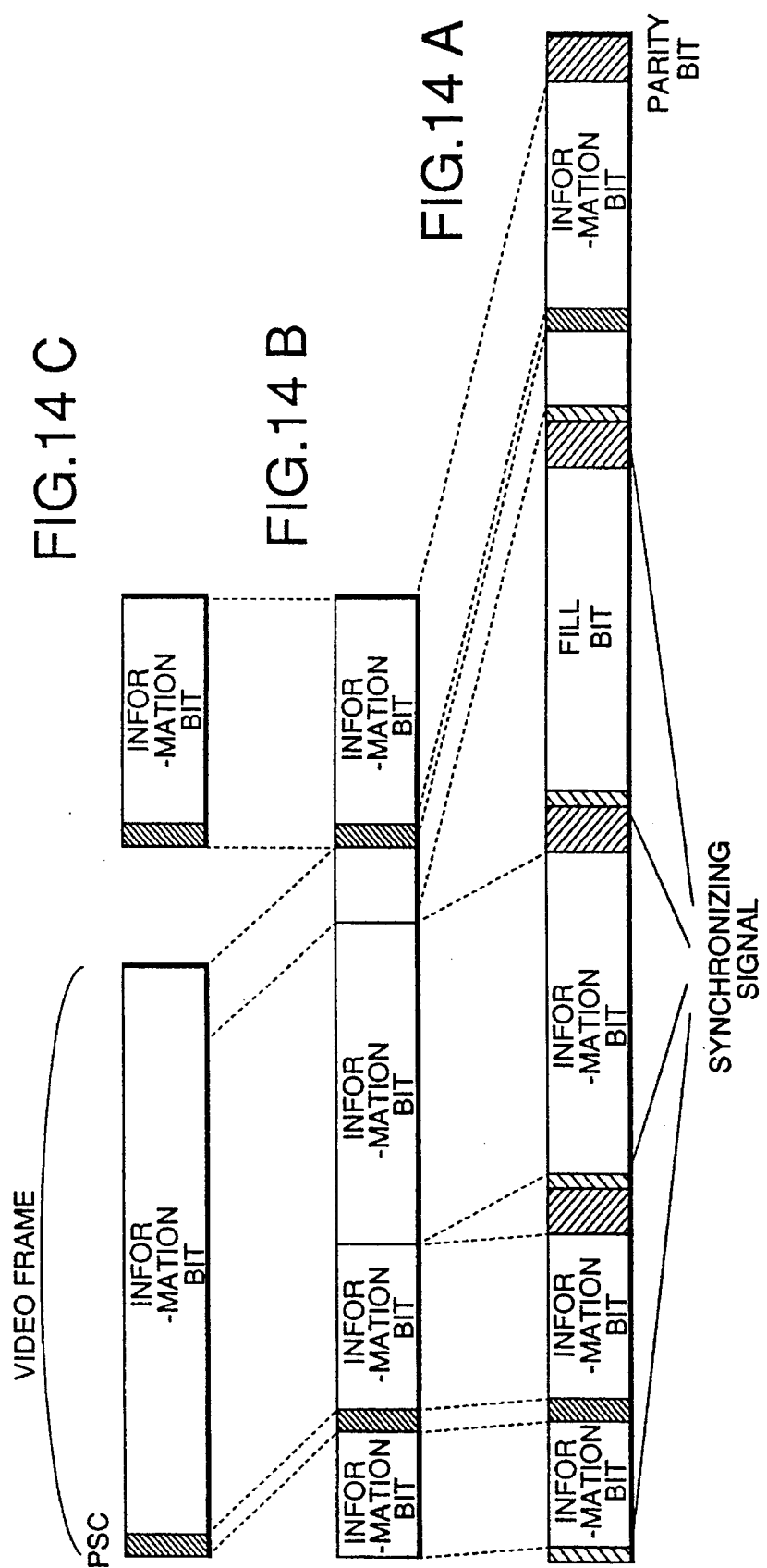
FIGS. 14A, 14B and 14C are illustrative of video data between modules of the receiver shown in FIG. 13. according to the present invention.

FIGS. 14A to 14C are illustrative of video data A, B and C between modules of the receiver portion shown in FIG. 13. FIG. 14A corresponds to a signal "A" shown in FIG. 13, which is comprised of a synchronizing signal for FEC, parity bits, fill bits for adjusting an amount of coded data and an information bit. FIG. 14B corresponds to a signal "B" shown in FIG. 13, which is corrected for error and relieved of redundant data, e.g., fill bits. FIG. 14C corresponds to a signal "C" shown in FIG. 13, which is a video frame extracted by PSC (picture start code).

Figure 15:
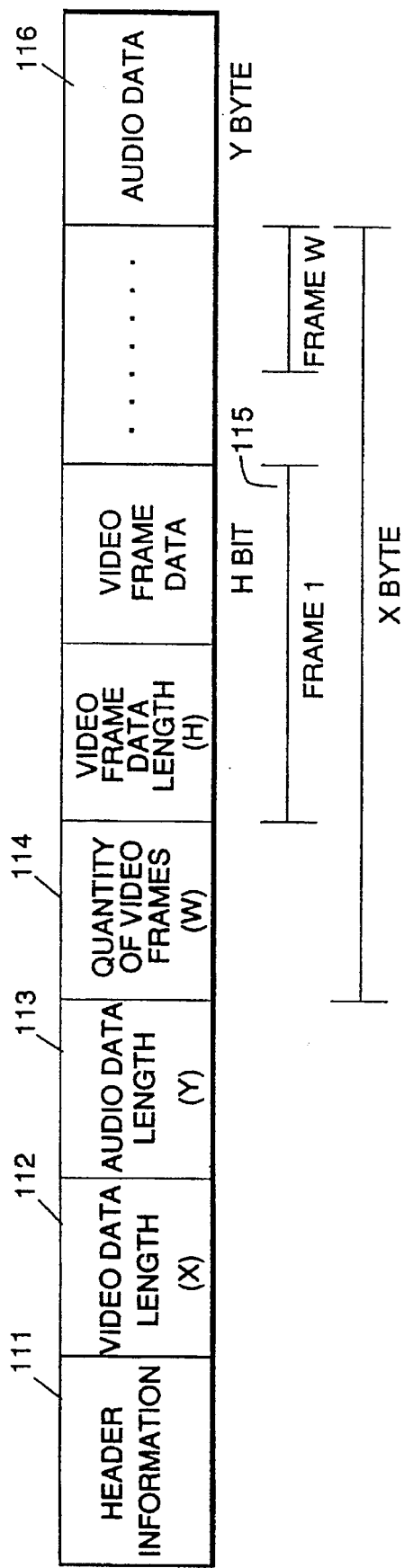
FIG. 15 is illustrative of a stored paket format according to the present invention.

FIG. 15 shows a structure of a packet to be stored, which includes information: a header containing information 111 on multiplexing rate at storing, encoding method and encoding capability; a video data length 112, a audio data length 113; the number of video frames 114 in a packet; a data length of a video frame and video frame data 115; and audio data 116.

The operation of the image-information storage regenerating device according to the present invention is as follows:

At data storing, the channel data demultiplexing portion 91 splits the multiplexed data received through the network into audio/video data and other components and, then, transfers the video data to the error correcting portion 92 and audio data to the packet assembling portion 94. The error correcting portion 92 receives video data as a signal in the state shown in FIG. 14A, conducts error correction of the data and outputs video data as a signal in the state shown in FIG. 14B to the video frame extracting portion 93 that in turn searches PSC (picture start code) in the received data and outputs data in the state shown in FIG. 14C to the packet assembling portion 94. The packet assembling portion 94 assembles a packet of received audio/video data according to the packet format shown in FIG. 15, then it writes the header information on multiplexing rate, encoding method and coding capability necessary for regeneration of the data and outputs the prepared data to the storage device 83.

Figure 16:
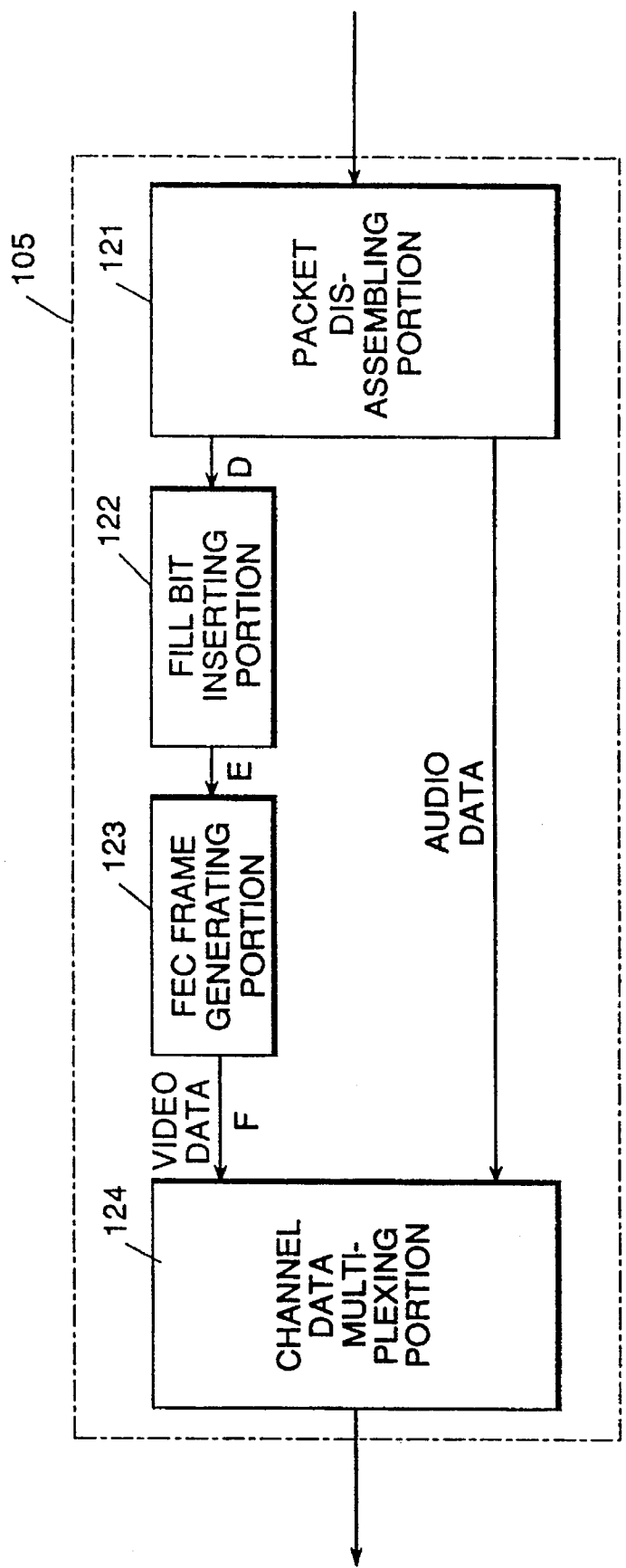
FIG. 16 is a construction view of a transmitter of multiplexed data transmitting and receiving portion shown in FIG. 12.

FIG. 16 is a construction view of a transmitter of the multiplexed data transmitting and receiving means shown in FIG. 12. There are shown a packet disassembling portion 121, a fill bit inserting portion 122, a FEC frame generating portion 123 and a channel data multiplexing portion 124. The packet disassembling portion 121 disassembles a received packet into audio/video data and other data. The fill bit inserting portion 122 inserts fill bits into the video data outputted from the packet disassembling portion 121. The FEC frame generating portion 123 produces a FEC frame from the video data outputted from the fill bit inserting portion 122. The channel data multiplexing portion 124 generates a channel multiplexed data from the video data outputted from the FEC frame generating portion 123 and the audio data outputted from the packet disassembling portion 121.

Figure 17:
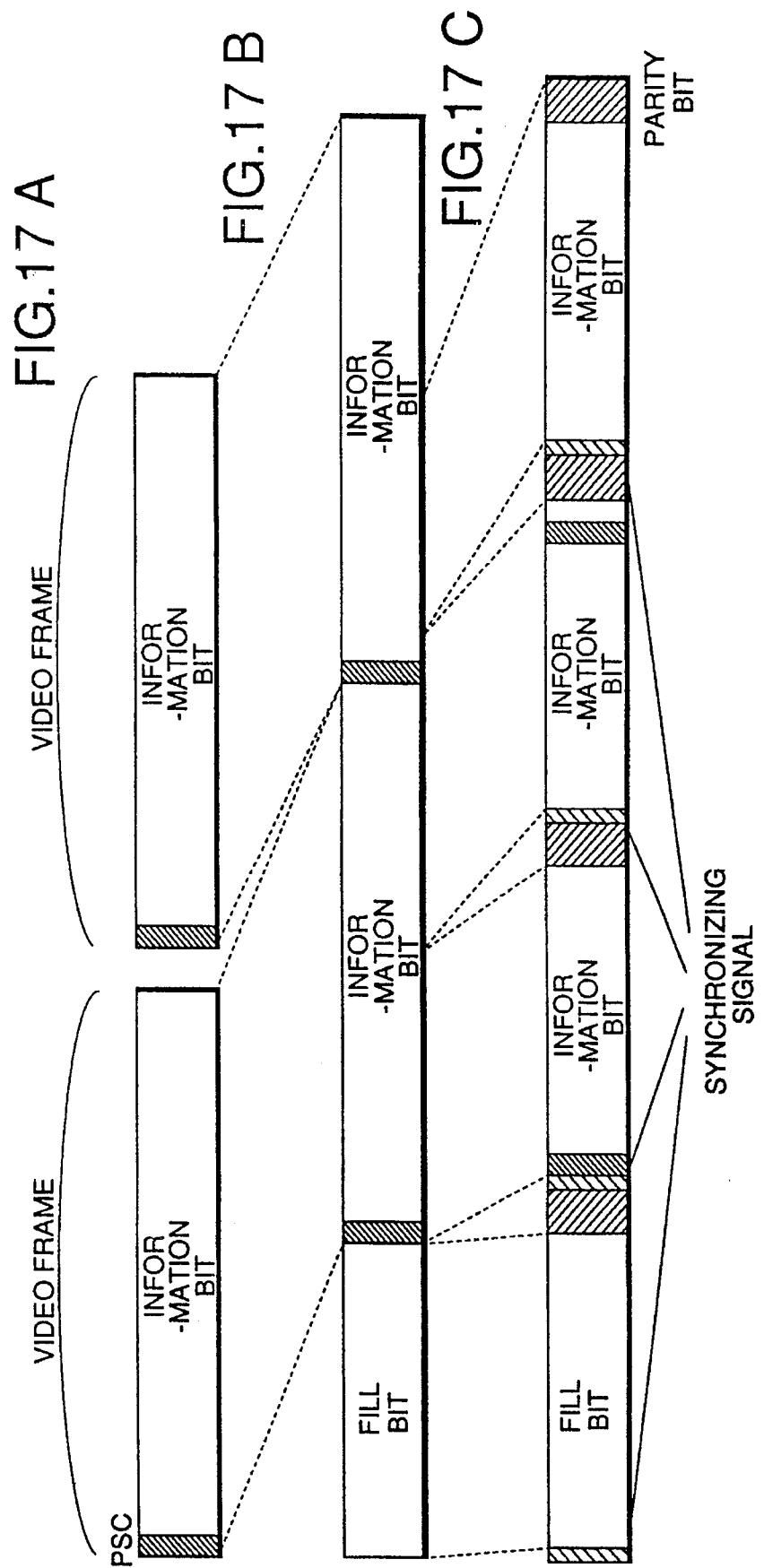
FIGS. 17A, 17B and 17C are illustrative of video data between modules of the transmitter shown in FIG. 16.

FIGS. 17A to 17C are illustrative of video data between modules of the transmitter portion shown in FIG. 16. FIG. 17A corresponds to a signal "D" shown in FIG. 16, which is a video frame data. FIG. 17B corresponds to a signal "E" shown in FIG. 16, which is filled with fill bits. FIG. 17C corresponds to a signal "F" shown in FIG. 16, which is a FEC frame containing a synchronizing signal for FEC and parity bits for correction of transmission error.

The operation of the transmitter portion shown in FIG. 16 is as follows.

At data regenerating, the packet disassembling portion 121 receives a packet outputted from the storage device 83, extracts therefrom header information and transfers it to the system control portion 81 that in turn instructs the channel data multiplexing portion 124 to match with each other the operating modes of a regenerating side terminal and a sending side terminal by using BAS 14 shown in FIG. 2. After matching for operation mode of the terminal is completed at the channel data multiplexing portion 124, the packet disassembling portion 121 disassembles a packet and transfers video data to the fill bit inserting portion 122 and audio data and other information to the channel data multiplexing portion 124.

The fill bit inserting portion 122 inserts fill bits into the video data to enable the communication terminal to establish and maintain synchronization of FEC frame before regenerating the stored video data thereat, then it transfers the video data to the FEC frame generating portion 123 that in turn produces a FEC frame and transfers it to the channel data multiplexing portion 124. The channel data multiplexing portion 124 multiplexes video data together with audio data according to a multiplexing format showing in FIG. 2 and sends the multiplexed data into the network.

The present invention provides a data storing format adapted to effectively overcome problems, which may arise at data regeneration in a video storage and delivery system, and realizes quick and smooth regeneration of stored video data. Namely, the channel data demultiplexing portion 91 separates the multiplexed input data to respective components. The error correcting portion 92 corrects an error of video data outputted from the channel data demultiplexing portion 91. The video frame extracting portion 93 extracts a video frame from the data outputted from the error correcting portion 92. The packet assembling portion 94 assembles a packet of the video data outputted from the video frame extracting portion 93 and the audio data outputted from the channel data demultiplexing portion 91. The storage device 83 stores therein the packet outputted from the packet assembling portion 94. Accordingly, video data are stored as video frames in the storage device 83.

A packet comprised of video data and audio data with header information is outputted from the storage device 83 to the packet disassembling portion 121 that disassembles said packet. The fill bit inserting portion 122 inserts fill bits in video data outputted from the packet disassembling portion 121. The FEC frame generating portion 123 generates a FEC frame from the video data outputted from the fill bit inserting portion 122. The channel data multiplexing portion 124 produces multiplexed data of video data outputted from the FEC frame generating portion 123 and of audio data and other information outputted from the packet disassembling portion 121. Thus multiplexed data are effective to control synchronization at the terminal for regeneration of delivered images.

Figure 18:
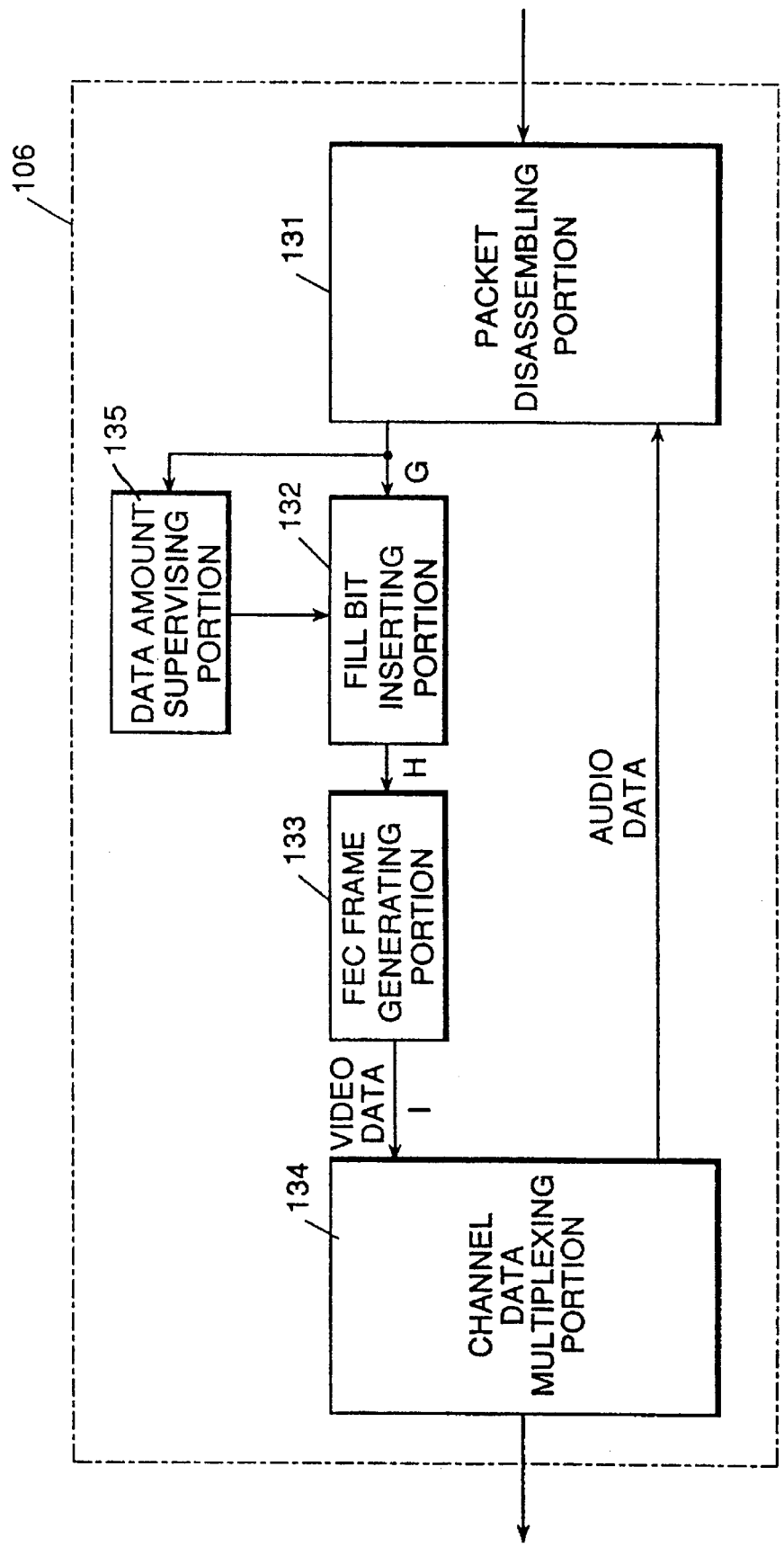
FIG. 18 is another construction view of a transmitter of multiplexed data transmitting and receiving portion shown in FIG. 12.

FIG. 18 shows another construction of a transmitter of the multiplexed data transmitting and receiving portion shown in FIG. 12. There are indicated a transmitter portion 106, a packet disassembling 131, a fill bit inserting portion 132, a FEC frame generating portion 133, a channel data multiplexing portion 134 and a data amount supervising portion 135.

The packet disassembling portion 131 disassembles a received packet into audio/video data. The fill bit inserting portion 132 inserts fill bits into the received video data. The FEC frame generating portion 133 produces a FEC frame of the received video data. The channel data multiplexing portion 134 generates channel multiplexed data. The data amount supervising portion 135 monitors an amount of information and controls insertion of fill bits as need be.

FIGS. 19A to 19C are illustrative of video data between modules of the receiver portion shown in FIG. 18. FIG. 19A corresponds to a signal "G" 'shown in FIG. 18, which is video frame data. FIG. 19B corresponds to a signal "H" shown in FIG. 18, which is data filled with fill bits. FIG. 19C corresponds to a signal "I" shown in FIG. 18, which is a FEC frame containing a synchronizing signal for FEC and parity bits for transmission error correction.

The operation of the transmitter portion shown in FIG. 18 is as follows.

At data regenerating, the packet disassembling portion 131 receives a packet outputted from the storage device 83, extracts therefrom header information and transfers it to the system control portion 81 that in turn directs the channel data multiplexing portion 134 to make the operating mode of receiving side terminal with that of sending side terminal by using BAS 14 shown in FIG. 2. After matching is completed at the channel data multiplexing portion 134, the packet disassembling portion 131 disassembles a packet, transfers video data to the fill bit inserting portion 132 and the data amount supervising portion 135 and transfers audio data and other information to the channel data multiplexing portion 134.

The fill bit inserting portion 132 inserts fill bits into the video data under control of the data amount supervising portion 135 and transfers the video data to the FEC frame generating portion 133 that in turn produces a FEC frame and transfers it to the channel data multiplexing portion 134. The channel data multiplexing portion 134 multiplexes audio/video data according to a multiplexing format shown in FIG. 2 and enters the multiplexed data into the network.

The present invention is thus directed to prevent any terminal from being subjected to overflow and underflow of its buffer memory when regenerating video data in a video storage and delivery system.

A packet comprised of audio/video data with header information is outputted from the storage device 83 to the packet disassembling portion 131 that disassembles said packet. The fill bit inserting portion 132 inserts fill bits into video data outputted from the packet disassembling portion 131. The data amount supervising portion 135 monitors an amount of the video data outputted from the packet disassembling portion 131 and controls the fill bit inserting portion 132. The FEC frame generating portion 133 generates a FEC frame from the video data outputted from the fill bit inserting portion 132. The channel data multiplexing portion 134 produces multiplexed data of the video data outputted from the FEC frame generating portion 133 together with the audio data and other information outputted from the packet disassembling portion 131. The information amount of the stored image is thus controlled for regeneration at a terminal.

Figure 20:
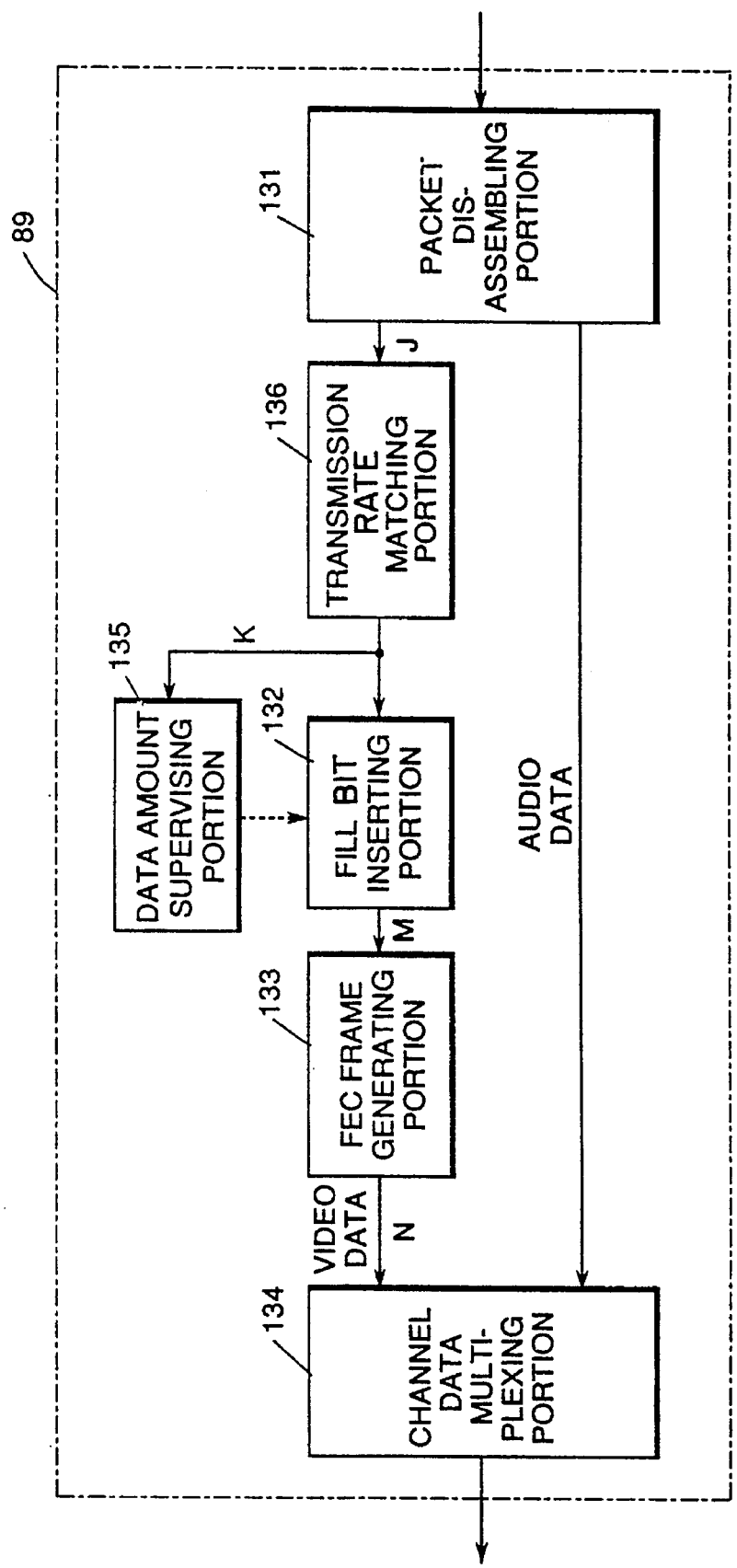
FIG. 20 is another construction view of a transmitter of multiplexed data transmitting and receiving portion shown in FIG. 12.

FIG. 20 shows another construction of a transmitter of the multiplexed data transmitting and receiving portion shown in FIG. 12. In FIG. 20, numeral 136 designates a transmission rate matching portions and other potions similar in function to those of FIG. 18 are given the same reference numerals.

The transmission rate matching portion 136 regulates an output of the received video data to match with due transmission rate. For instance, for video data which were stored at a rate of 10 video frames per second, 10 video frames are outputted for a second, irrespective of a data transmission rate at data regeneration.

Figure 21:
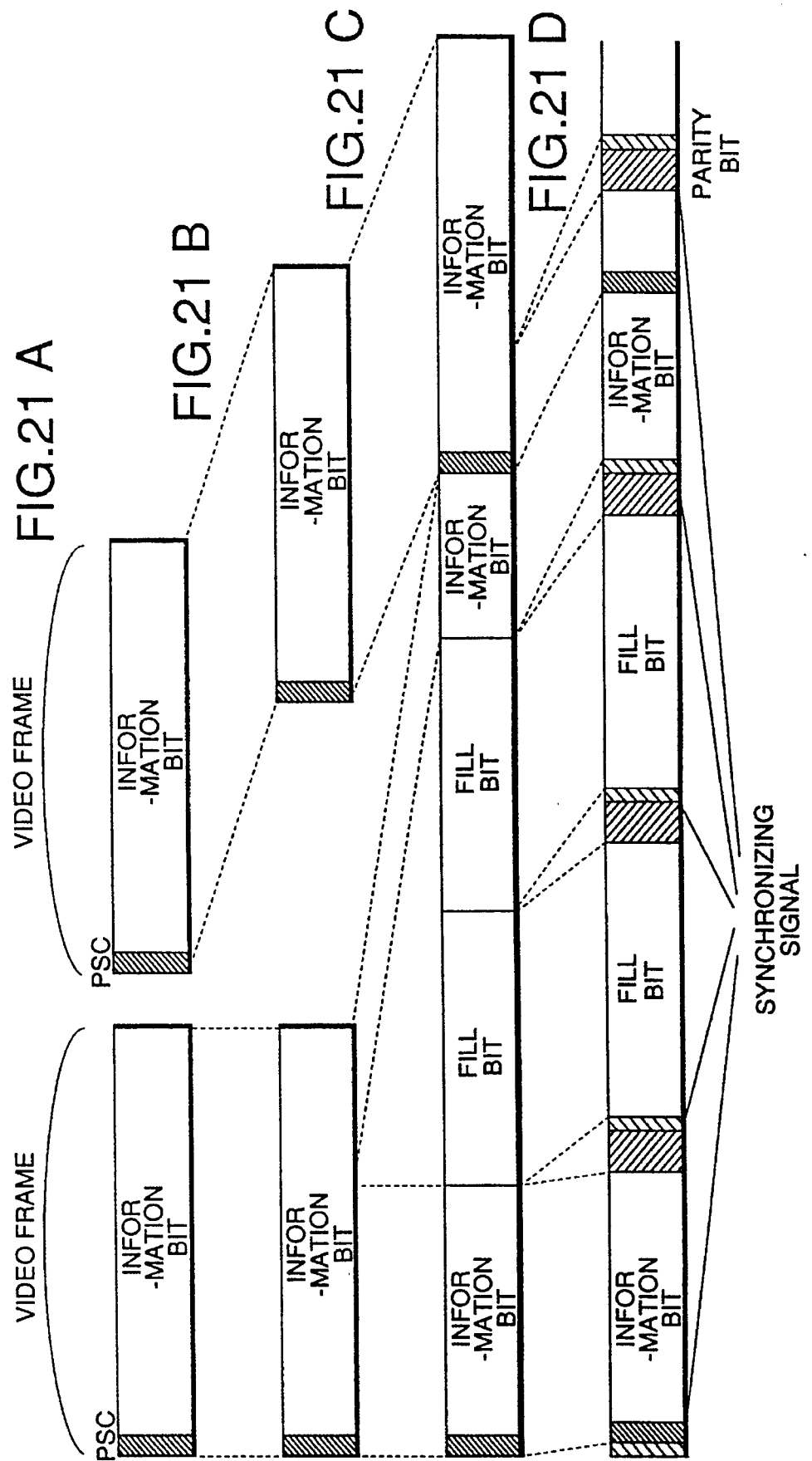
FIGS. 21A, 21B, 21C and 21D are illustrative of video data between modules of the transmitter shown in FIG. 20.

FIGS. 21A to 21D are illustrative of video data between modules of the receiver portion shown in FIG. 20. FIG. 21A corresponds to a signal "J" shown in FIG. 20, which is video frame data. FIG. 21B corresponds to a signal "K" shown in FIG. 20, which is video frame data with a controlled output.

FIG. 21C corresponds to a signal "M" shown in FIG. 20, which is filled with fill bits. FIG. 21D corresponds to a signal "N" shown in FIG. 20, which is a FEC frame containing a synchronizing signal for FEC and parity bits for transmission error correction.

The operation of the transmitter portion shown in FIG. 20 is as follows.

At data regenerating, the packet disassembling portion 131 receives a packet outputted from the storage device 83, extracts therefrom header information and transfers it to the system control portion 81 that in turn directs the channel data multiplexing portion 134 to match the operating mode of the receiving side with that of the sending side by using BAS 14 shown in FIG. 2. If the channel data multiplexing portion 134 can not realize an operation mode matched with the receiving terminal because the receiving terminal for regeneration has faster channel rate than a terminal that transmitted the stored data, it changes the transmission rate with the receiving terminal in an operation mode being closest to that of the terminal side. After completion of changing the transmission rate with the receiving terminal, the packet disassembling portion 131 disassembles a packet and transfers video data to the transmission rate matching portion 136 that in turn adjusts an output of the received video data and transfers the video data with the controlled output to the fill bit inserting portion 132 and the data amount supervising portion 135.

The fill bit inserting portion 132 inserts fill bits into the video data under control of the data amount supervising portion 135 and transfers the video data to the FEC frame generating portion 133 that in turn produces a FEC frame and transfers it to the channel data multiplexing portion 134. The channel data multiplexing portion 134 multiplexes audio/video data according to a multiplexing format showing in FIG. 2 and transmits the multiplexed data over the network to the terminal.

As described above, the present invention enables a video storing and delivery system to regenerate stored video data at a terminal even if the latter has a different transmission rate from the transmission rate of the video data at storing. Namely, the packet disassembling portion 131 disassembles a packet comprised of audio/video data with header information. The transmission rate matching portion 136 performs matching of a transmission rate of the video data outputted from the packet disassembling portion 131. The data amount supervising portion 135 monitors an amount of the video data and the fill bit inserting portion 132 inserts fill bits into the video data. The FEC frame generating portion 133 generates a FEC frame from the video data outputted from the fill bit inserting portion 132. The channel data multiplexing portion 134 produces multiplexed data of the video data outputted from the FEC frame generating portion 133 together with the audio data and other information outputted from the packet disassembling portion 131. The above-mentioned processing makes it possible to regenerate the stored video data at a terminal having a transmission rate different from that of the data storing side.

Figure 22:
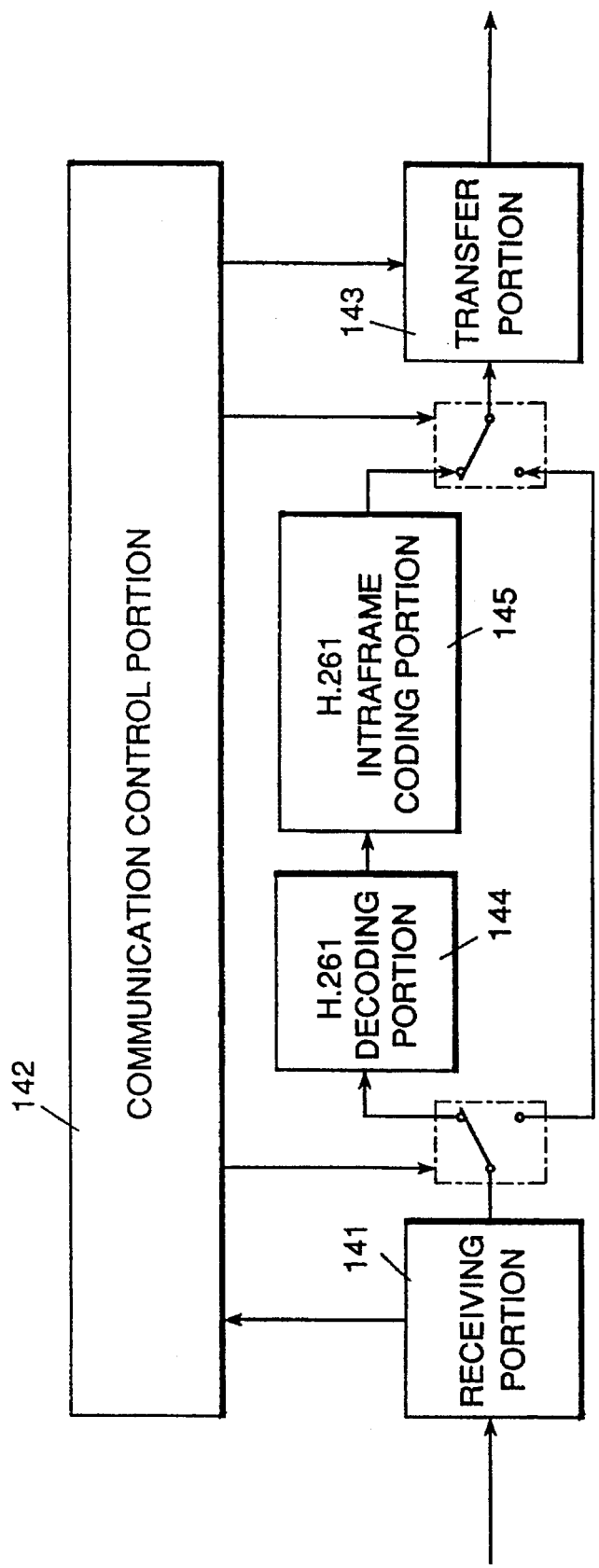
FIG. 22 is an another construction view for explaining an image-information storage regenerating device embodying the present invention.

FIG. 22 is an another construction view for explaining an example of image-information storage regenerating device according to the present invention, which includes a receiving portion 141, a communication control portion 142, a transfer portion 143, a decoding portion (H.261) 144 and an intra-frame coding portion (H.261) 145.

First, the receiving portion 141 receives coded video data and sends said data to the decoding portion (H.261) 144 or the transfer portion 143 under the control of the communication control portion 142. The coded video data are conventionally coded video data which similarly as usual video data, are encoded by a hybrid coding method combining motion compensative inter-frame prediction with intra-frame orthogonal transform coding.

The communication control portion 142 switches over control channel of transfer portion 143 and a video data transmission line in the state of beginning or ending of data storing. The decoding portion (H.261) 144 decodes the coded video data to reproduce the video data. This portion, like a usual decoder H.261, executes processing such as motion compensative prediction decoding and inverse discrete cosine transform (inverse DCT).

In the intra-frame coding portion (H.261) 145, the video data decoded by the decoding portion (H.261) 144 are encoded again but in the intra-mode only. The transfer portion 143 receives the coded video data from the intra-frame coding portion (H.261) 145 or the receiving portion 141 and transfers said data to the host center (storage) under the control of the communication control portion 142.

Figure 23:
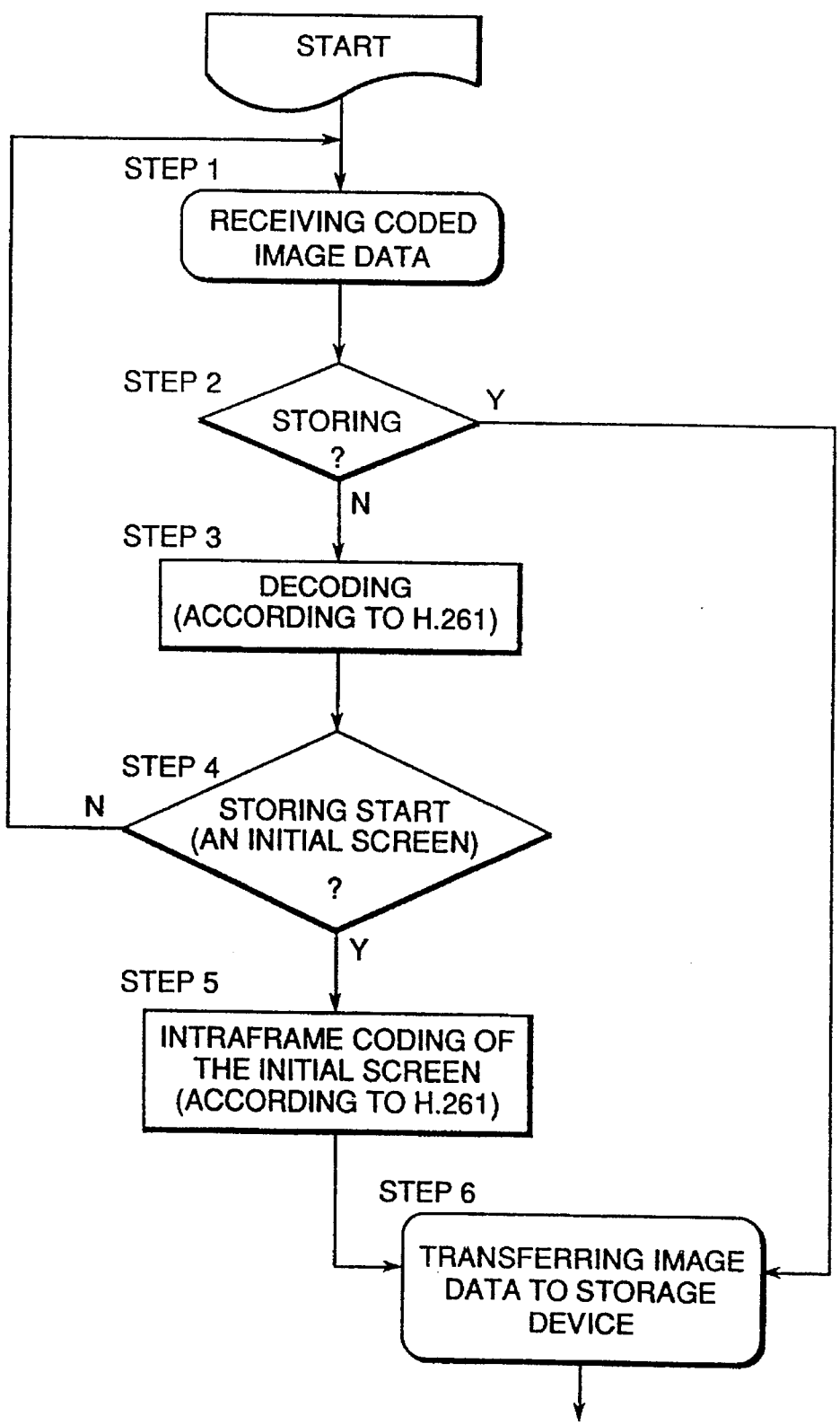
FIG. 23 is a flow chart of image data for explaining the operation of an image-information storage regenerating device shown in FIG. 22.

FIG. 23 is a flow chart for explaining the operation of the image-information storage regenerating device according to the present invention shown in FIG. 22. The operation of this device is as follows:

During a data storing cycle from the storing end to the storing start (with an initial screen—the first unit of a moving video sequence), coded video data are first received (step 1), check is made whether storing being executed or not (step 2), and, if not, the received coded data are decoded (step 3). Next, check is made whether the data relates to an initial screen with which storing starts (step 4), and, if not, the operation returns to step 1. If the data is an initial screen, said initial screen is read out from a frame memory of the decoding portion (H.261) 144 (step 3) and is sent through the intra-frame coding portion (H.261) 145 to the transfer portion 143 (step 5). Upon receipt of a "transfer" command from the communication control portion 142 the transfer portion 143 starts transferring the video data. It stops the operation when the storing is finished (step 6).

The intra-frame coding portion (H.261) 145 encodes an initial screen of moving video sequence in the intra-mode specified in the recommendation H.261 and outputs it as coded video data. For this purpose, the intra-frame coding portion (H.261) 145 does not need to execute inter-frame predictive coding of video data, thereby it becomes unnecessary to perform motion compensative prediction, which takes a greater part of processing load for a usual H.261 coder, and to use a frame memory for that purpose. Consequently, the intra-frame coding portion 145 is required to perform very simple processing and have a simple hardware like a still image coder.

When the device being in the state of storing video data, i.e., step 2 judges the video data are now stored, coded video data, which are subsequent to an initial screen comprising video data coded in the intra-mode only, are sent screen by screen directly from the receiving portion 141 to the transfer portion 143, bypassing the coding portion (H.261) 144 and the intra-frame coding portion (H.261) 145. They are further sent to the storage and stored therein.

As described above, according to the present invention, an initial screen of coded video data to be stored is a frame of video data coded by intra-frame coding, which serves as a reference frame to which subsequent frame relates, and further frames are of video data coded by hybrid coding method using a combination of conventional motion compensative inter-frame predictive coding and intra-frame orthogonal transfer coding. Therefore, it becomes possible to make up a sequence of video data, which has a frame coded by intra-frame coding at the head and includes subsequent frames coded by conventional hybrid coding method.

Figure 24:
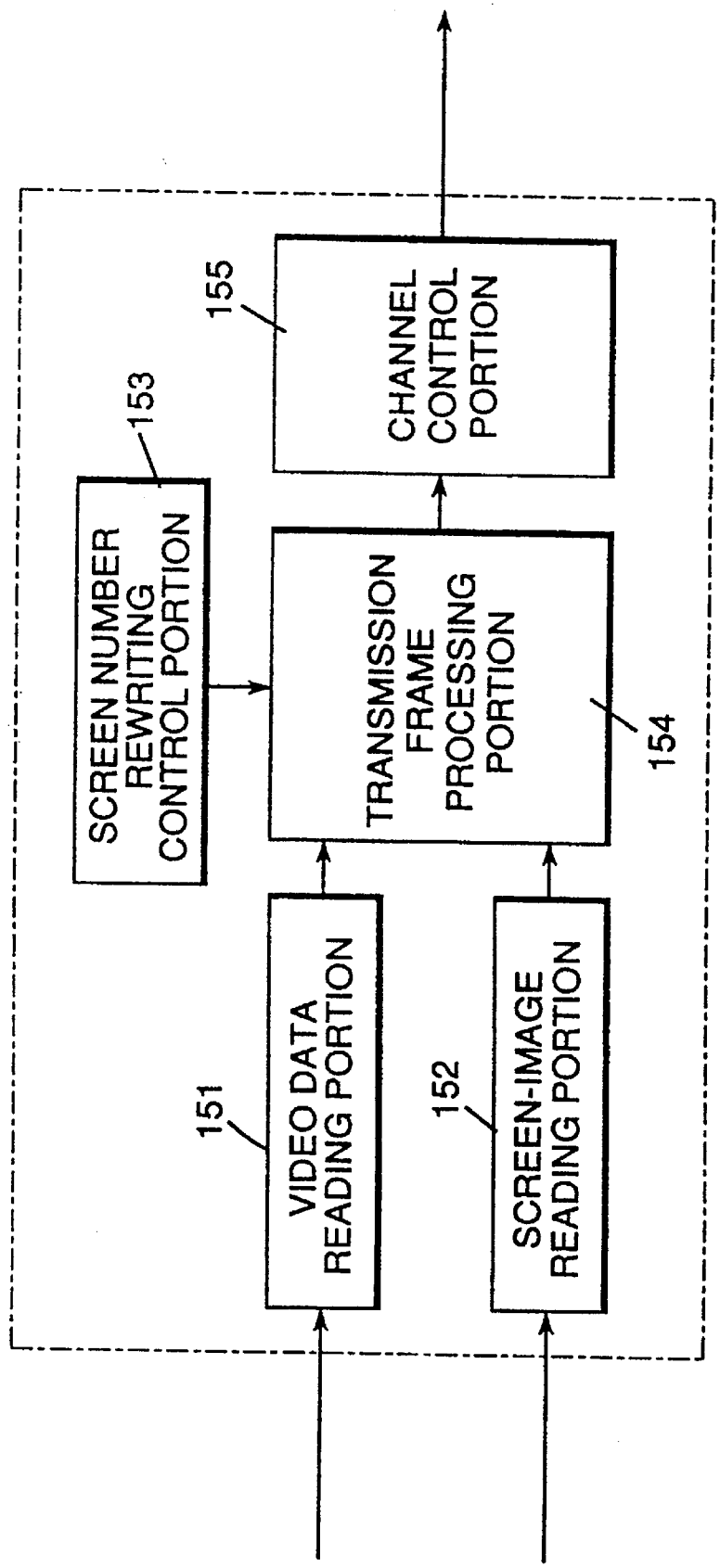
FIG. 24 is an another construction view for explaining an image-information storage regeneration device embodying the present invention.

FIG. 24 is an another construction view for explaining an example of image-information storage regeneration device according to the present invention, which includes a video data reading portion 151, a screen-image reading portion 152, a screen number rewriting control portion 153, a transmission frame processing portion 154 and a channel control portion 155.

First, the video data reading portion 151 reads video data, which are encoded according to an encoding system based upon the ITU-T recommendation H.261, from a storage device. The screen-image reading portion 152 reads conversational screen-images, i.e., pages (screenfuls) of information such as to indicate a service menu or a guidance to use the service. The screen number rewriting control portion 153 gives an instruction to rewrite screen (frame) numbers of the coded information stored in the storage device and read-out therefrom for further transmission to an AV-terminal. The transmission frame processing portion 154 rewrites screen (frame) numbers of the coded video data read by both the video data reading portion 151 and the screen-image reading portion 152 according to the instruction given by the screen (frame) number rewriting control portion 153 to prepare frame information for transmisson, which are transmitted by the channel control portion 155 over a communication channel to the AV-terminal.

Figure 25:
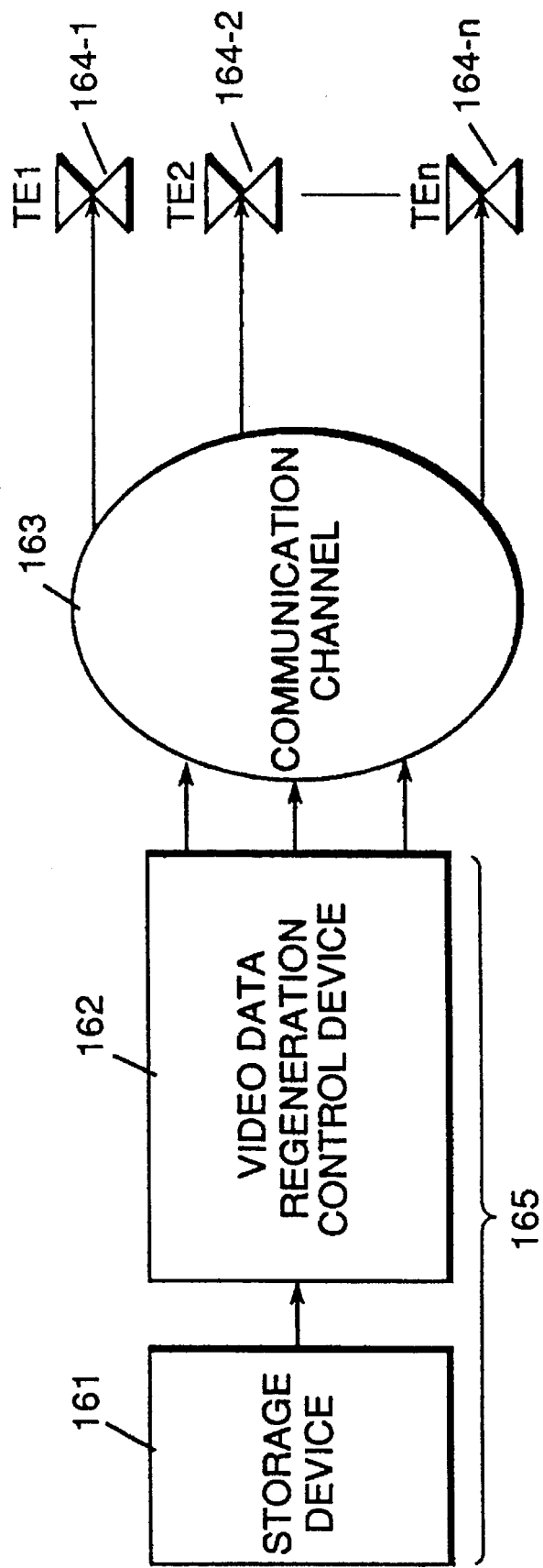
FIG. 25 shows an example of connection of an video data regeneration control device of the present invention with receiving terminals.

FIG. 25 is a view for explaining an exemplified system in which a video data regeneration control device embodying the present invention is used in combination with receiving terminals. The system includes a storage device 161, an video data control device 162, a communication channel 163, AV-terminals 164-1–164-n and a center control device 165.

The storage device 161 stores records of coded video data. The video data regeneration control device 162 is an embodiment of the present invention, which reads video data and screen-images from the storage device 161 and transmits them to the AV-terminal 164-1. The center control device 165 is comprised of the storage device 161 and the video data regeneration control device 162. The communication channel 163 may be a public network or a private channel. The AV-terminals 164-1–164-n are adapted to communicate with the video data regeneration control device 162 over the communication channel 163 and receives coded video data from the storage device 161 and regenerates the data in the form of video images on its display screen.

FIGS. 26A and 26B show a correlation between frames and screen numbers (frame numbers) of video data encoded according to the encoding method defined by the ITU-T recommendation H. 261 and stored in the storage device 161. FIG. 26A shows a sequence of video data(1) and FIG. 26B shows a sequence of video data(2). The frames are given respective serial screen (frame) numbers.

FIG. 27 is a view showing a correlation between screen (frame) numbers of video data to be transmitted and screen (frame) numbers of stored video data when transmitting coded video data of different objects from a storage to an AV-terminal. An example of communication between the video data regeneration control device and an AV-terminal is described as follows:

Upon receipt of a communication-start request from an AV-terminal, the video data regeneration control device 162 reads coded video data stored in the storage device 161 and transmits the data to the AV-terminal 164-1. In this case, a sequence of the video data 1 read-out in the order of frame numbers from the storage device 161 as shown in FIGS. 26A and 26B are not subjected to any processing by the transmission frame processing portion 154 and transmitted through the communication channel control portion 155 to the AV-terminal 164-1 that in turn regenerates a sequence of the received video data in the order of their frame numbers.

If two different video data sequences are successively read from the storage device 161 and transmitted without any processing to the AV-terminal 164-1, two image sequences are reproduced at the same order of frame numbers (i.e. frame interval) as those of the data stored in the storage device 161, that causes a delay between the last frame of the preceding image sequence and the top frame of the succeeding image sequence as shown in FIG. 11, giving an impression of discontinuity of the reproduced images. To avoid this, in the video data regeneration control device 162, the screen number rewriting control portion 153 instructs the transmission frame processing portion 154 to rewrite screen (frame) numbers of the succeeding video data as shown in FIG. 27.

Figure 28:
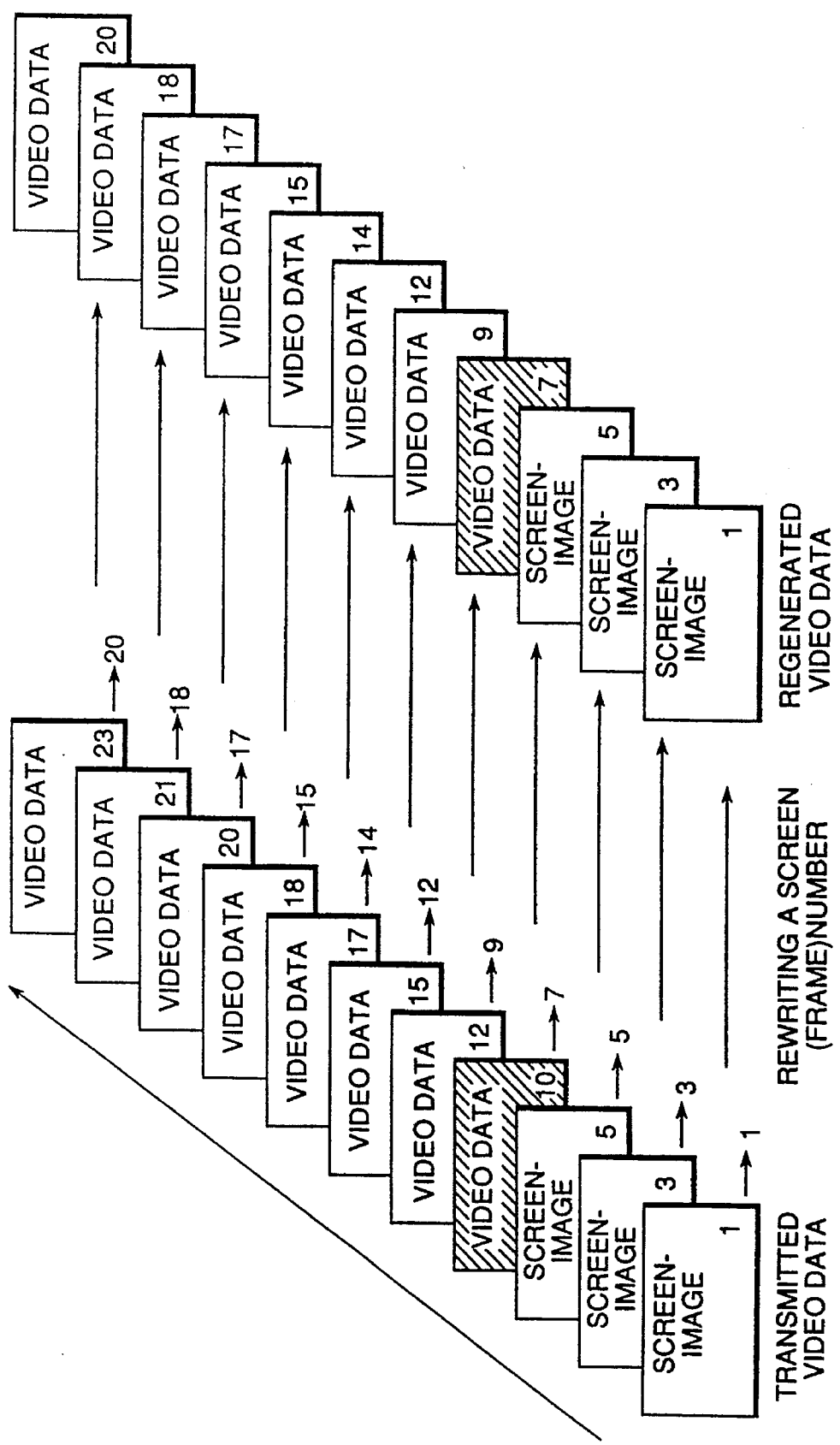
FIG. 28 is an explanatory view 2 showing a correlation between screen (frame) numbers of video data transmitted and screen (frame) number of video data regenerated by an image-information storage regeneration device according to the present invention.

For instance, the first transmittable video data 1 (screen images) shown in FIG. 26A without rewriting its frame numbers is first transmitted through the channel control 155 to the AV-terminal 164-1. Next, the video data reading portion 151 reads video data 2 shown in FIG. 26B from the storage device 161 and the the screen (frame) number rewriting control portion 153 instructs the transmission frame processing portion 154 to change a screen (frame) number "10" into "7" of the top frame which is then transmitted through the channel control portion 155 to the AV-terminal 164-1. Succeeding frames of the same video data are subjected to rewriting their numbers "12" into "9", "15" into "12" and so on as shown in FIG. 27, keeping the same (unchanged) increment in numbers (i.e., at a specified constant frame interval), and, then, they are transmitted one by one to the AV-terminal 164-1. Frames of another different video data are successively processed by similarly rewriting their number and transmitted to the AV-terminal. As shown in FIG. 28, this processing realizes smooth and continuous regeneration of concatenated video data without causing a delay at a junction of two different video data.

As described above, the present invention is directed to the provision of an image-information regeneration control device including a frame number rewriting control portion, which, in case of transmitting two or more different groups of coded video data from a storage device to an AV-terminal, rewrites a top screen (frame) number of succeeding different video data into a number consistent with that of the last frame of preceding different video data and rewrites successive frames of the same video data into respective numbers having a constant (not changed) increment for the purpose of realizing smooth and continuous reproduction of different video data, independent of their stored frame numbers, at any AV-terminal.

Namely, the video data regeneration control device for reading any coded video data from the storage device for further transmission is connected through a communication channel with the AV-terminal for receiving and decoding the video data for reproduction of images. The video data regeneration control device includes a frame number rewriting control portion which, in case of transmitting a plurality of different groups of coded video data from a storage device to an AV-terminal, instructs a transmission frame processing portion to rewrite frame numbers of a group of video data in succession to a preceding group in such a way that a top frame of the subsequent group of video data may have a number consistent with that of the last frame of the precedent group and the subsequent frames of the same group may have respective new serial numbers keeping a specified (unchanged) increment. Thus processed video data are then transmitted to the AV-terminal that can successively decode the received video data without delay between the end of the preceding video data group and the start of the subsequent group.

Figure 29:
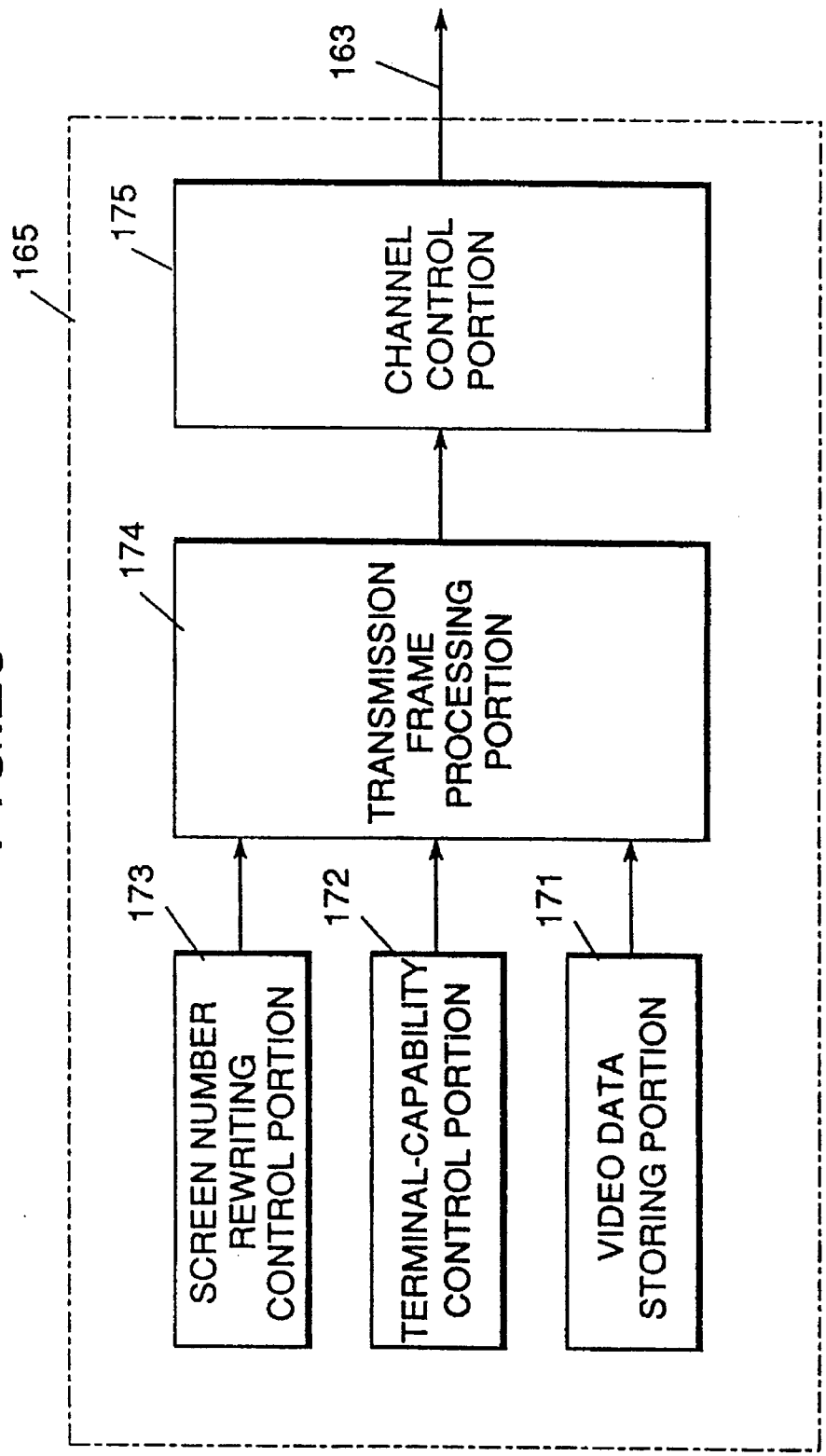
FIG. 29 is a construction view of a center control device shown in FIG. 25.

FIG. 29 shows a configuration of the center control device shown in FIG. 25, which comprises an video data storage portion 171, a terminal-capability control portion 172, a frame (screen) number rewriting control portion 173, a transmission frame processing portion 174 and a channel control portion 175. Other portions similar in function with those of FIG. 25 are denoted by the same reference codes.

The video data storage portion 171 stores records of video data encoded according to the coding method defined by the ITU-T recomendation H.261. The terminal-capability control portion 172 controls decoding capability of each terminal that receives coded video data and reproduces the images on its display screen. The frame number rewriting control portion 173 gives an instruction to rewrite frame numbers of the coded video data stored in the storage portion 171 before they are transmitted to a terminal. The transmission frame processing portion 174 reads the video data from the storage portion 171, rewrites the video frame numbers according to the instruction given by the frame number rewriting control portion and prepares frames for transmission. The channel control portion 175 transmits the prepared frames to the receiving terminal over the communication channel 163. FIG. 30 shows a correlation between screen (frame) numbers and frames of the video data that is encoded at an frame interval $1/29.97$ seconds (hereinafter described as $1/30$ sec.) according to a coding method defined by the ITU-T recomendation H.261 and stored in the video data storage portion 171 shown in FIG. 29. The frames are given respective consecutive numbers.

FIG. 31 shows correlation between the frame numbers of the coded video data stored in the storage portion (FIG. 30) and frame numbers of the frames to be transmitted to the terminal that can decode video data at a minimum frame interval of $2/29.97$ seconds (hereinafter described as $2/30$ sec.).

An example of communication between the center control device 165 and the terminal 164-1 is described as follows:

When the center control device 165 receives a communication-start request from the terminal 164-1, it operates the terminal-capability control portion 172 to check the decoding capability of the terminal before transmitting thereto the coded video data stored in the video data storage portion 171. When a frame interval of the stored frames is of $1/30$ sec. and the terminal has sufficient capability to decode coded video data frames at minimum frame interval of $1/30$ sec, the transmission frame processing portion 174 reads the video data from the storage portion 171 in the order of frame numbers as shown in FIG. 31 and transfers them, without any kind of processing, to the channel control portion 175 that successively transmits the received frames to the terminal 164-1 over the communication channel. The terminal 164-1 decodes the received coded video data at a frame interval of $1/30$ sec.

On the other hand, when the terminal 164-1 has a capability to decode frames at a minimum frame interval of $2/30$ sec., i. e. it can not decode the coded video data stored in the storage portion 171, the center control device 165 causes the frame-number rewriting control portion 173 to give the transmission frame processing portion 172 an instruction necessary for rewriting frame numbers as shown in FIG. 31. In this case, a first transmissive frame is a frame (1) of the stored coded video data shown in FIG. 30, which is not subjected to rewriting its number and transmitted through the channel control portion 175 to the terminal 164-1.

Next, the frame number rewriting control portion 173 requests the transmission frame processing portion 174 to read a frame (2) shown in FIG. 30 from the video data storage portion 171 and changes the frame number of the frame (2) from "1" into "2". The frame is then transmitted through the channel control portion 175 to the terminal 164-1. A frame (3) is next read from the video data storage portion 171, subjected to changing its number from "2" into "4" and transmitted to the terminal. The subsequent frames are successively renewed in their numbers and transmitted to the terminal.

In the above-described example, it is supposed that the terminal has a capability to decode the frames at a frame interval of $2/30$ sec. corresponding to that the half number of the frames of video data stored in the storage portion 171 can be decoded within a same time scale. If the terminal has a capability to decode frames at a frame interval of $3/30$ seconds (standard value is $3/29.97$), the first transmissive frame (1) is read and transmitted without any processing. The frames (2) and (3) to be transmitted second and third are subjected to rewriting their numbers to "3" and "6" respectively. Subsequent frames are similarly processed with renewed numbers before transmission to the terminal.

Similarly, when terminal can decode frames at a minimum frame interval of $4/30$ seconds (standard value is $4/29.97$), the initial frame (1) is read and immediately transmitted to the terminal. The second and third transmissive frame (2) and (3) are subjected to rewriting their numbers to "4" and "8" respectively.

As described above, the center control device 165 according to the present invention is provided with a frame number rewriting control portion 173 for rewriting frame numbers of coded video data stored in a storage portion 171, which, thereby, is capable of rewriting the screen (frame) numbers of the coded video data in accordance with the decoding capability of the receiving terminal before transmitting the video data thereto.

The center control device 165 wherein coded video data is stored and a terminal for decoding coded video data to reproduce therefrom video are connected with each other through a communication channel there between. The center control device 165 includes a terminal-capability control portion 172 for controlling decoding capability of the terminal and a frame number rewriting control portion 173 for instructing a transmission frame processing portion 174 for rewriting frame numbers according to the decoding capablity of the terminal, which, therefore, is capable of preparing frames having renewed numbers and being slowly reproducible at the terminal, thus realizing a communication between the center control device 165 and the terminal.

Figure 32:
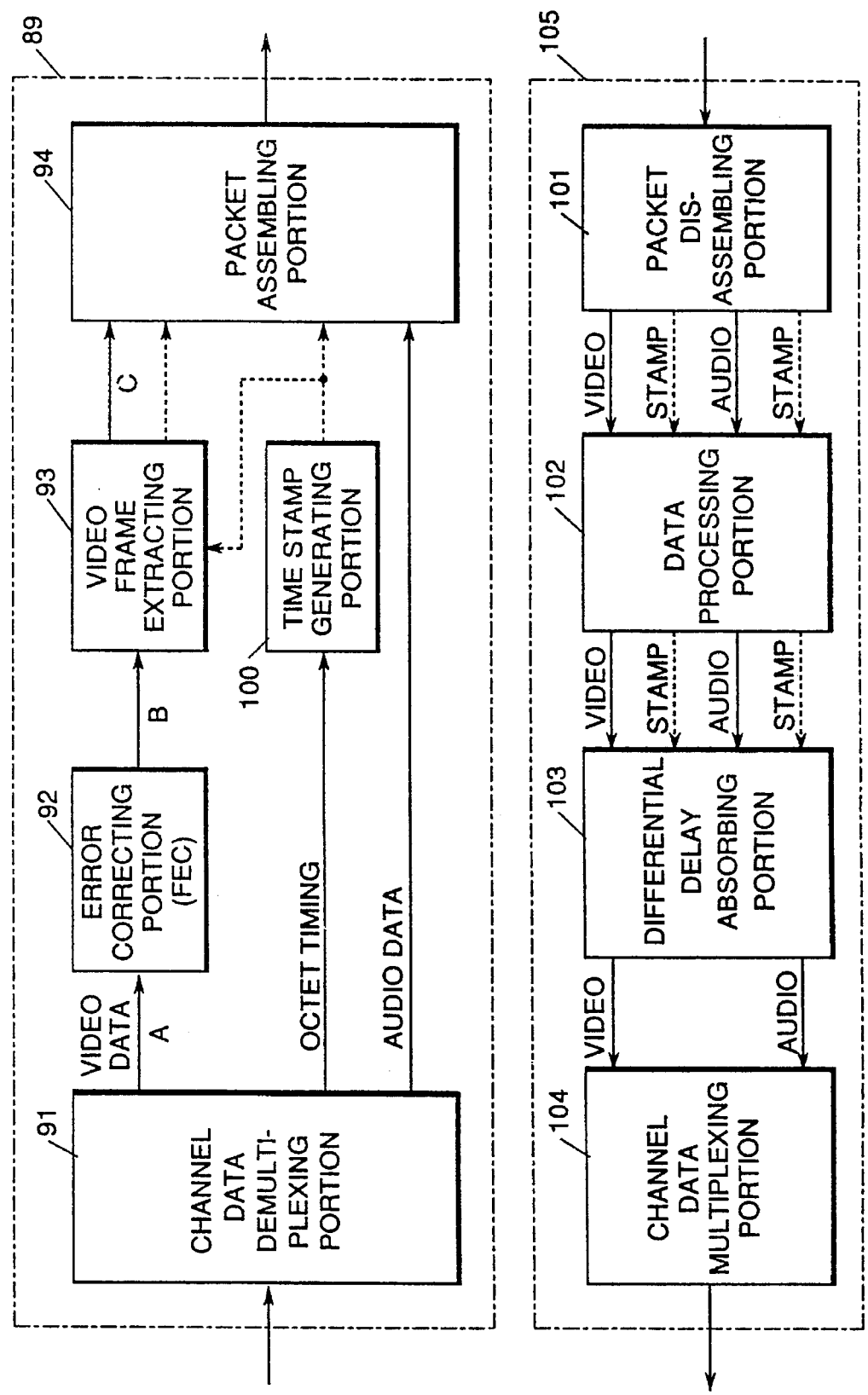
FIG. 32 is a construction view of a multiplexed data transmitting and receiving portion shown in FIG. 12.

FIG. 32 is a construction view for explaining an example of a multiplexed data transmitting and receiving portion of the host shown in FIG. 12. In FIG. 32, there are shown a receiver portion 89, a transmitter portion 105, a channel data demultiplexing portion 91, an error correcting portion 92 for FEC (forward error correction), a video frame extracting portion 93 and a packet assembling portion 94, a time stamp generating portion 100, a packet disassembling portion 101, a data processing portion 102, a differential delay absorbing portion 103 and a channel data multiplexing portion 104.

The channel data demultiplexing portion 91 separates multiplexed data received through the network into respective components. The error correcting portion 92 corrects transmission error of demultiplexed video data, and the video frame extracting portion 93 extracts a video frame from the error corrected video data. The packet assembling portion 94 assembles a packet of the audio/video data. The time stamp generating portion 100 generates a time stamp by using an octet timing signal outputted from the channel data separating portion 91. The packet disassembling portion 101 demultiplexes a received packet into audio/video data and other information. The data processing portion 102 make some due processing of audio/video data. The differential delay absorbing portion 103 absorbs a possible differential delay of the processed audio/video signals in their regeneration by using time stamps attached thereto. The channel data multiplexing portion 104 generates channel multiplexed data of audio/video data and other information received from the differential delay absorbing portion 103.

FIGS. 14A to 14C are illustrative of video data A, B and C between modules of the receiver portion shown in FIG. 32. FIG. 14A corresponds to a signal "A" shown in FIG. 32, which is comprised of a synchronizing signal for FEC, parity bits, fill bits for adjusting an amount of coded data, and an information bit. FIG. 14B corresponds to a signal "B" shown in FIG. 32, which is corrected for error and relieved of redundant data, e.g., fill bits. FIG. 14C corresponds to a signal "C" shown in FIG. 32, which is a video frame extracted by PSC (picture start code).

Figure 33:
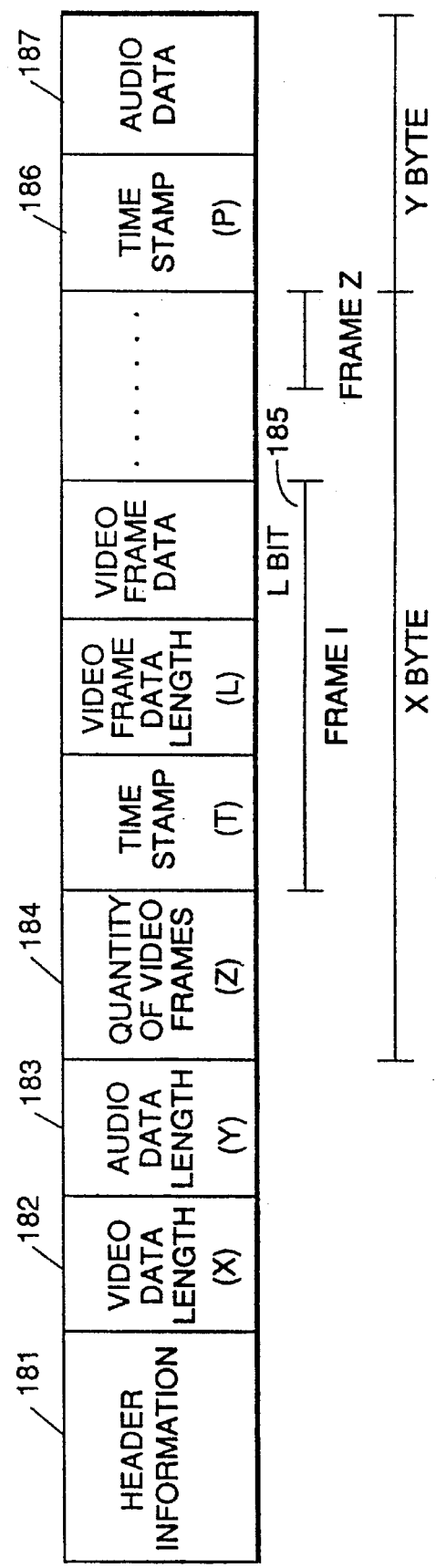
FIG. 33 is illustrative of a stored packet format according to the present invention.

FIG. 33 shows a structure of a packet to be stored, which includes header information containing storing information on multiplexing rate, encoding method and encoding capacity 181; a video data length 182, an audio data length 183; the number of stored video frames 184; a time stamp of video data, data length of a video frame and video frame data 185; and a time stamp of audio data 186 and audio data 187.

The operation of the multiplexed data storing and regenerating device according to the present invention is as follows:

At data storing, the channel data demultiplexing portion 91 splits multiplexed data received through the network into audio/video data and other information and, then, transfers the video data to the error correcting portion 92, the audio data to the packet assembling portion 94 and octet timing information to the time stamp generating portion 100. The time stamp generating portion 100 generates a time stamp per octet and outputs it to both the video frame extracting portion 93 and the packet assembling portion 94. The error correcting portion 92 receives video data as a signal in the state shown in FIG. 14A, conducts error correction of the data and outputs video data as a signal in the state shown in FIG. 14B to the video frame extracting portion 93.

The video frame extracting portion 93 searches PSC (picture start code) in the received data and outputs data in the state shown in FIG. 14C and outputs a time stamp corresponding to the time point of finding the PSC to the packet assembling portion 94. The packet assembling portion 94 assembles a packet from the received audio/video data and attached time stamps according to the packet format shown in FIG. 33, then it writes the header information on multiplexing rate, encoding method and coding capacity necessary for regeneration of the data and outputs the prepared data to the storage device 83.

At data regenerating, the packet disassembling portion 101 receives a packet outputted from the storage device 83, extracts therefrom header information and transfers it to the system control portion 81 that in turn instructs the channel data multiplexing portion 104 to make the operating mode at receiving side match with that of sending side by using BAS 14 shown in FIG. 2.

After completion of matching at the channel data multiplexing portion 104, the packet disassembling portion 101 disassembles a packet and transfers audio/video data and attached time stamps to the data processing portion 102 that in turn performs some due operations on the audio/video data and outputs the processed audio/video data with the time stamps to the differential delay absorbing portion 103. The differential delay absorbing portion 103 absorbs a differential delay of the respective component data by the attached time stamp and outputs the prepared data to the channel data multiplexing portion 104 that in turn multiplexes the audio/video data and other information according to the multiplexing format shown in FIG. 2 and sends the multiplexed data into the network.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

We claim:

1. An image-information storage regenerating device comprising:

multiplexed data transmitting and receiving means for receiving multiplexed data from a terminal and storing the received multiplexed data, said terminal multiplexing any of video data, audio data and control data to provide the multiplexed data, and for transmitting the stored multiplexed data to said terminal as regenerated data; and storage means for storing therein the received multiplexed data received by said multiplexed data transmitting and receiving means and for outputting therefrom the stored multiplexed data to said multiplexed data transmitting and receiving means for regeneration, said multiplexed data transmitting and receiving means separating the received multiplexed data into separated video data, audio data and control data and storing the separated video data in said storage means frame by frame as continuous video frames.

2. The image-information storage regenerating device as defined in claim 1, wherein said multiplexed data transmitting and receiving means comprises:

channel data demultiplexing means for separating the received multiplexed data into the separated video data, audio data and control data;

error correcting means for correcting errors in the separated video data output from said channel data demultiplexing means;

video frame extracting means for extracting a frame of video data from the corrected video data output from said error correcting means; and packet assembling means for assembling a packet from the extracted frame of video data and the separated audio data, said storage means storing therein an assembled packet output from said packet assembling means as having the separated video data arranged frame by frame as continuous video frames.

3. The image-information storage and regenerating device as defined in claim 1, wherein the stored multiplexed data is stored in said storage means in packets, said multiplexed data transmitting and receiving means comprising:

packet disassembling means for disassembling a packet output from said storage means into the separated video data, audio data and control data;

fill bit inserting means for selectively inserting fill bits into the separated video data output from said packet disassembling means;

error correction frame generating means for producing an error corrected frame of video data from an output of said fill bit inserting means; and channel data multiplexing means for multiplexing the corrected video data output from said error correction frame generating means and the separated audio and control data output from said packet disassembling means, said terminal means maintaining synchronization of the received regenerated data based on the error corrected frames of video data.

4. The image-information storage regenerating device as defined in claim 1, wherein the stored multiplexed data is stored in said storage means in packets, said multiplexed data transmitting and receiving means comprising:

packet disassembling means for disassembling a packet output from said storage means into the separated video data, audio data and control data;

fill bit inserting means for inserting fill bits into the separated video data output from said packet disassembling means;

data amount supervising means for monitoring an information content of the separated video data output from said packet disassembling means and controlling said fill bit inserting means;

error correction frame generating means for producing an error corrected frame of video data from an output of said fill bit inserting means; and channel data multiplexing means for multiplexing the corrected video data output from said error correction frame generating means and the separated audio and control data output from said packet disassembling means to form the regenerated data, said terminal means maintaining synchronization of the received regenerated data based on the error corrected frames of video data.

5. The image information storage regenerating device as defined in claim 1, wherein the stored multiplexed data is stored in said storage means in packets, said multiplexed data transmitting and receiving means comprising:

packet disassembling means for disassembling a packet output from said storage means into the separated video data, audio data add control data;

transmission speed matching means for matching a transmission rate with the separated video data output from said packet disassembling means;

fill bit inserting means for inserting fill bits into the separated video data output from said transmission speed matching means;

data amount supervising means for monitoring an information content of the separated video data output from said transmission speed matching means and controlling said fill bit inserting means;

error correction frame generating means for producing an error corrected frame of video data from an output of said fill bit inserting means; and channel data multiplexing means for multiplexing the corrected video data output from said error correction frame generating means and the separated audio and control data output from said packet disassembling means to form the regenerated data, said terminal means maintaining synchronization of the received regenerated-data based on the error corrected frames of video data.

6. The image-information storage regenerating device as defined in claim 1, wherein said multiplexed data transmitting and receiving means comprises:

video data decoding means for decoding the separated video data; and intra-frame encoding means for encoding in an intra-frame mode the video data decoded by said video data decoding means so that the separated video data of an initial image to be stored in said storage means is transferred through said video data decoding means and said intra-frame video data encoding means and stored as intra-frame coded video data.

7. An image-information storage regenerating device for use in video delivery services, the image-information storage regenerating device reading coded video data from a storage memory and delivering the coded video data to a terminal, the image-information storage regenerating device comprising:

transmission frame processing means for preparing the coded video data read from said storage memory for transmission to said terminal, the coded video data being stored in said storage memory as sequences of screens of coded video data with designated screen numbers;

channel control means, coupled to said transmission frame processing means, for delivering the prepared coded video data to said terminal; and screen-number rewriting control means, coupled to said transmission frame processing means, for controlling preparation of the coded video data so that when different sequences of coded video data are to be transmitted to said terminal, said transmission frame processing means rewrites screen numbers of the coded video data of the different sequences to be sequential.

8. The image-information storage regenerating device as defined in claim 7, further comprising:

video data reading means for reading the stored coded video data and for providing the read coded video data to said transmission frame processing means; and screen-image reading means for reading as a screen-image a menu image to be displayed at said terminal and for providing the read screen-image to said transmission frame processing means, said transmission frame processing means rewriting screen numbers of coded video data provided by said video data reading means and said screen-image reading means to be sequential when preparing coded video data from said video data reading means in succession to coded video data from said screen-image reading means, according to an instruction provided by said screen-number rewriting control means, to eliminate a discrepancy between the coded video data of a screen-image and the coded video data read from said storage memory and to provide continuous transmission of prepared coded video data.

9. The image-information storage regenerating device as defined in claim 7, further comprising:

terminal-capability control means for discriminating and controlling decoding capacity of the terminal to which prepared coded video data shall be transmitted so that when a decoding minimum frame interval of the terminal is larger than a frame interval of the stored coded video data, said screen-number rewriting control means rewrites screen numbers of the stored coded video data to attain prepared coded video data having a frame interval decodable by the terminal.

10. An image-information storage regenerating device for storing multiplexed data comprising any of video data, audio data and control data and for regenerating the stored multiplexed data for transmission to a terminal, the image-information storage regenerating device comprising:

multiplexed data transmitting and receiving means for eliminating a differential delay in the multiplexed data by attaching a time stamp to the multiplexed data prior to storing the multiplexed data; and storage means for storing the multiplexed data having the attached time stamp and for outputting the stored multiplexed data to said multiplexed data transmitting and receiving means for regeneration, said multiplexed data transmitting and receiving means attaching a time stamp to each of the video data, audio data and control data components of the multiplexed data prior to storage in said storage means and absorbing a differential delay between the data components in accordance with the attached time stamps so as to eliminate a differential delay between different data components during regeneration of the stored multiplexed data.

11. The image-information storage regenerating device as defined in claim 10, wherein said multiplexed data transmitting and receiving means comprises:

channel data demultiplexing means for splitting a received multiplexed input signal video data, audio data and control data components;

error correcting means for correcting an error in the video data output from said channel data demultiplexing means;

time stamp generating means for generating time stamp data according to an octet timing signal output from said channel data demultiplexing means;

video frame extracting means for extracting a video frame from the corrected video data output from said error correcting means and for extracting a time stamp of an image corresponding to the extracted video frame from the time stamp data output from said time stamp generating means;

packet assembling means for assembling a packet by arranging the extracted video frame, the audio data, the control data, the time stamp data output from said time stamp generating means and the extracted time stamp, the assembled packet being stored in said storage means as the multiplexed data;

packet disassembling means for receiving a stored packet output from said storage means and for disassembling the stored packet into component data including video data, audio data, control data and an attached time stamp;

data processing means for processing and outputting the component data output from said packet disassembling means;

differential delay absorbing means for absorbing a differential delay between different processed component data in accordance with corresponding time stamps output from said data processing means; and channel data multiplexing means for multiplexing the delay absorbed data components output from said differential delay absorbing means to provide the regenerated stored multiplexed data, such that a differential delay between the data components separated from the multiplexed data is absorbed.

* * * * *

UNITED STATES PATENT AND TRADEMARK OFFICE
CERTIFICATE OF CORRECTION

PATENT NO. : 5,594,736
DATED : January 14, 1997
INVENTOR(S) : Masahiro TATSUMI et al.

It is certified that error appears in the above-indentified patent and that said Letters Patent is hereby corrected as shown below:

On title page, Assignee should read:

[73] Assignee: Sharp Kabushiki Kaisha, Osaka, Japan and Nippon Telegraph and Telephone Corporation, Tokyo, Japan Signed and Sealed this Second Day of December, 1997

Attest:

BRUCE LEHMAN

*Attesting Officer*  *Commissioner of Patents and Trademarks*